US010779256B2

(12) United States Patent
Edge et al.

(10) Patent No.: US 10,779,256 B2
(45) Date of Patent: *Sep. 15, 2020

(54) SYSTEMS AND METHODS FOR POSITIONING MOBILE DEVICES IN A FIFTH GENERATION WIRELESS NETWORK

(71) Applicant: QUALCOMM Incorporated, San Diego, CA (US)

(72) Inventors: Stephen William Edge, Escondido, CA (US); Sven Fischer, Nuremberg (DE); Masato Kitazoe, Hachiouji (JP); Haris Zisimopoulos, London (GB); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,355

(22) Filed: Sep. 16, 2019

(65) Prior Publication Data
US 2020/0037283 A1 Jan. 30, 2020

Related U.S. Application Data

(63) Continuation of application No. 15/951,870, filed on Apr. 12, 2018, now Pat. No. 10,433,275.
(Continued)

(51) Int. Cl.
*H04W 64/00* (2009.01)
*H04W 88/08* (2009.01)
(Continued)

(52) U.S. Cl.
CPC .............. *H04W 64/00* (2013.01); *G01S 5/00* (2013.01); *G01S 5/0036* (2013.01); *G01S 5/02* (2013.01);
(Continued)

(58) Field of Classification Search
CPC ..... H04W 64/00; H04W 88/08; H04W 88/02; H04W 4/02; H04W 88/18; H04W 76/50;
(Continued)

(56) References Cited

U.S. PATENT DOCUMENTS 9,998,856 B2 * 6/2018 Edge .................. H04W 4/02
10,219,217 B2 * 2/2019 Larsson et al. ... H04W 52/0216
(Continued)

OTHER PUBLICATIONS

"3GPP Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP Standard; Technical Specification; 3GPP TS 36.305. 3rd Generation Partnership Project (3GPP), Mobile Competence Centre; 658, Route Des Lucioles; F-06921, Sophia-Antipolis Cedex; France, vol. RAN WG2, No. V14.1.8, Mar. 22, 2017 (Mar. 22, 2017), XP051291358, pp. 1-78.
(Continued)

*Primary Examiner* — Meless N Zewdu
(74) *Attorney, Agent, or Firm* — Weaver Austin Villeneuve & Sampson LLP

(57) ABSTRACT

Techniques described herein are directed toward enabling location support for 5G New Radio (NR) wireless access by a user equipment (UE) by utilizing existing LTE location support. More specifically, LTE positioning protocol (LPP) messages may be communicated between a UE with NR wireless access and a location server (e.g. an LMF) in a 5G Core Network via an NG-RAN. The LPP messages may support RAT-independent and E-UTRA position methods by the UE such as A-GNSS or OTDOA for E-UTRA. The location server may obtain OTDOA related information from eNBs and ng-eNBs supporting LTE wireless access. A UE may request measurement gaps from a 5G base station (e.g. gNB) in order to obtain measurements for RAT-inde-
(Continued)

pendent and E-UTRA position methods and may request an idle period in order to obtain LTE timing needed for E-UTRA measurements.

30 Claims, 11 Drawing Sheets

Related U.S. Application Data

(60) Provisional application No. 62/511,958, filed on May 26, 2017.

(51) Int. Cl.
*H04W 4/02* (2018.01)
*H04W 88/18* (2009.01)
*G01S 5/00* (2006.01)
*G01S 5/02* (2010.01)
*G01S 19/06* (2010.01)
*H04W 76/27* (2018.01)
*H04W 88/02* (2009.01)
*H04W 84/04* (2009.01)
*H04W 76/50* (2018.01)

(52) U.S. Cl.
CPC .......... *G01S 5/0236* (2013.01); *G01S 5/0263* (2013.01); *G01S 19/06* (2013.01); *H04W 4/02* (2013.01); *H04W 76/27* (2018.02); *H04W 88/08* (2013.01); *H04W 88/18* (2013.01); *H04W 76/50* (2018.02); *H04W 84/042* (2013.01); *H04W 88/02* (2013.01)

(58) Field of Classification Search
CPC ... H04W 84/042; H04W 4/025; H04W 4/029; H04W 8/12; H04W 8/18; H04W 48/02; H04W 48/04; H04W 8/22; H04W 4/14; H04W 88/023; H04W 88/00; H04W 92/00; H04W 92/02; H04W 92/10; H04W 92/14; H04W 92/16; H04W 80/00; H04W 80/02; H04W 80/04; H04W 80/06; H04W 88/042; H04W 56/0095; H04W 24/10; H04W 36/30; H04W 64/003; H04W 64/006; H04W 8/08; H04W 8/082; H04W 8/085; H04W 4/021; H04W 4/023; H04W 76/10; H04W 76/20; H04W 76/27; H04W 76/00; G01S 5/00; G01S 5/02; G01S 5/0236; G01S 5/0263; G01S 5/0009; G01S 19/25; G01S 19/252; G01S 19/06; G01S 19/07; G01S 19/071; G01S 5/0018; G01S 5/0036; G01S 5/0045; G01S 5/0054; G01S 5/0063

See application file for complete search history.

(56) References Cited

U.S. PATENT DOCUMENTS

| | | | |
|---|---|---|---|
| 10,433,275 B2 * | 10/2019 | Edge et al. | H04W 64/00 |
| 2011/0183686 A1 | 7/2011 | Quinn et al. | |
| 2012/0083221 A1 | 4/2012 | Ranta-Aho et al. | |
| 2013/0267246 A1 * | 10/2013 | Wang et al. | H04W 24/00 |
| 2016/0205499 A1 * | 7/2016 | Davydov et al. | H04W 4/02 |
| 2016/0223641 A1 * | 8/2016 | Cheng et al. | G01S 5/10 |
| 2017/0142595 A1 | 5/2017 | Ljung et al. | |
| 2017/0332192 A1 | 11/2017 | Edge | |
| 2017/0367064 A1 | 12/2017 | Lu et al. | |
| 2018/0054796 A1 | 2/2018 | Edge | |
| 2018/0303342 A1 | 10/2018 | Khachaturian et al. | |
| 2018/0343635 A1 | 11/2018 | Edge et al. | |
| 2018/0376394 A1 * | 12/2018 | Hahn et al. | H04W 36/08 |
| 2019/0101615 A1 * | 4/2019 | Tenny | G01S 5/0045 |
| 2019/0230618 A1 * | 7/2019 | Saur et al. | H04W 64/003 |
| 2019/0274113 A1 * | 9/2019 | Jiang et al. | H04W 64/00 |
| 2020/0053703 A1 * | 2/2020 | Akkarakaran et al. | H04W 72/042 |
| 2020/0059888 A1 * | 2/2020 | Cui et al. | H04W 64/003 |
| 2020/0076518 A1 * | 3/2020 | Patel et al. | H04B 17/318 |

OTHER PUBLICATIONS

International Search Report and Written Opinion—PCT/US2018/027460—ISA/EPO—dated Jun. 27, 2018.
<font style="vertical-align: inherit;"><font style="vertical-align: inherit;">QUALCOMM INCORPORATED: "Location Services Alternatives for 5G System Architecture and 5G Procedures", 3GPP Draft; S2-171982, 3rd Generation Partnership Project (3GPP), Mobile Competence Centre, 650, Route Des Lucioles, F-06921, Sophia-A, vol. SA WG2, No. Busan, South Korea; Mar. 26, 2017 (Mar. 26, 2017), XP051247716, Retrieved from the Internet: URL:</font></font>http://www.3gpp.orgjftp/Meetings_3GPP_SYNC/SA2/Docs/<fontstyle="vertical-align: inherit;"><font style="vertical-align: inherit;">, pp. 30.</font></font>.
Taiwan Search Report—TW107112799—TIPO—dated Feb. 6, 2020.

* cited by examiner

SYSTEMS AND METHODS FOR POSITIONING MOBILE DEVICES IN A FIFTH GENERATION WIRELESS NETWORK

RELATED APPLICATIONS

This application is a continuation of U.S. Application No. 15/951,870, filed Apr. 12, 2018, entitled "SYSTEMS AND METHODS FOR POSITIONING IN A FIFTH GENERATION WIRELESS NETWORK", which claims the benefit of U.S. Provisional Application No. 62/511,958, filed May 26, 2017, entitled "SYSTEMS AND METHODS FOR POSITIONING IN A 5G WIRELESS NETWORK", both of which are assigned to the assignee hereof and incorporated by reference herein in their entirety.

BACKGROUND

1. Field

The subject matter disclosed herein relates to electronic devices, and more particularly to methods and apparatuses for use to support location of a mobile device using a fifth-generation (5G) wireless network.

2. Information

Standards to support 5G wireless networks are being developed by the 3rd Generation Partnership Project (3GPP). In the first release of 5G (3GPP Release 15), the 5G core network (5GC) is expected to support voice services and emergency calls. In some regions (e.g., US, Japan), supporting emergency calls may require supporting an accurate location of a mobile device. However, there may be no native 5G positioning support in the first release (Release 15) of the Next Generation Radio Access network (NG-RAN) used to support 5G wireless access. While an emergency call instigated over 5G might be redirected via fallback to fourth-generation (4G, or Long-Term Evolution (LTE)) where location support exists, the fallback may reduce the reliability of emergency calls (e.g. when 4G wireless coverage is not available) and may not comply with regulatory requirements in some countries. Therefore a solution is needed whereby an emergency call can be setup using 5G wireless access with location support but without location support using 5G wireless access positioning methods.

SUMMARY

Techniques described herein are directed toward enabling location support for 5G wireless access by utilizing existing LTE location support. More specifically, LTE positioning protocol (LPP) messages may be communicated between a user equipment (UE) and a location management function (LMF) in the 5GC via an NG-RAN for location support. The UE may also receive timing information and take measurements using existing LTE base stations.

An example method at a user equipment (UE) of supporting location of the UE with Fifth Generation (5G) New Radio (NR) wireless access, according to the disclosure, comprises receiving a first Long Term Evolution (LTE) Positioning Protocol (LPP) message from a location server, wherein the first LPP message comprises a location request and is received via a serving 5G base station. The method further comprises obtaining at least one location measurement based on the first LPP message, where the at least one location measurement comprises a measurement for a Radio Access Technology (RAT)-independent position method or a measurement for an Evolved Universal Terrestrial Radio Access (E-UTRA) position method. The method also comprises determining location information based on the at least one location measurement, and sending a second LPP message to the location server, where the second LPP message comprises the location information and is sent via the serving 5G base station.

Alternative embodiments of the method may include one or more of the following features. The location server may comprise a Location Management Function (LMF). The location information may comprise a location estimate for the UE. The location information may comprise the at least one location measurement. The first LPP message may comprise an LPP Request Location Information message and the second LPP message comprises an LPP Provide Location Information message. The at least one location measurement may comprise a location measurement for the RAT-independent position method, and the RAT-independent position method may comprise Assisted Global Navigation Satellite System (A-GNSS), Real Time Kinematics (RTK), Precise Point Positioning (PPP), Differential A-GNSS, Wireless Local Area Network (WLAN), Bluetooth, Sensors, or any combination thereof. The at least one location measurement may comprise a location measurement for the E-UTRA position method, and the E-UTRA position method may comprise Observed Time Difference Of Arrival (OTDOA) for E-UTRA or Enhanced Cell ID (ECID) for E-UTRA, or any combination thereof. The method may further comprise receiving a third LPP message from the location server, wherein the third LPP message comprises assistance data for the RAT-independent position method or the E-UTRA position method and is received via the serving 5G base station, and wherein obtaining the at least one location measurement is based on the assistance data. The third LPP message may comprise an LPP Provide Assistance Data message. The method may further comprise sending a request for measurement gaps to the serving 5G base station, and obtaining the at least one location measurement during a measurement gap. The request for measurement gaps may comprise an NR Radio Resource Control (RRC) message. The at least one location measurement may comprise a Reference Signal Time Difference (RSTD) measurement for OTDOA for E-UTRA, and the method may further comprise sending a request for an idle period to the serving 5G base station, and obtaining LTE timing and a System Frame Number (SFN) for an OTDOA reference cell during the idle period, where the request for measurement gaps is based on the LTE timing and the SFN. The OTDOA reference cell may comprise a cell for an evolved Node B (eNB) in an E-UTRA network (E-UTRAN) or a cell for a next generation eNB (ng-eNB) in a Next Generation Radio Access Network (NG-RAN), wherein the serving 5G base station is in the NG-RAN. The request for an idle period may comprise an NR Radio Resource Control (RRC) message. The method may further comprise receiving a fourth LPP message from the location server, where the fourth LPP message comprises a request for LPP positioning capabilities of the UE and is received via the serving 5G base station, and the method also comprises sending a fifth LPP message to the location server, wherein the fifth LPP message comprises the LPP positioning capabilities of the UE when the UE has NR wireless access and is sent via the serving 5G base station. The fourth LPP message may comprise an LPP Request Capabilities message and the fifth LPP message may comprise an LPP Provide Capabilities message. The method may further comprise sending an indication to an Access Management Function (AMF), wherein the indication comprises an indication that the UE supports LPP with NR wireless access, wherein the AMF transfers the indication to the location server. The first LPP message may be received in a Non-Access Stratum (NAS) transport message and the second LPP message may be sent in a NAS transport message.

An example user equipment (UE) with Fifth Generation (5G) New Radio (NR) wireless access, according to the disclosure, comprises a wireless communication interface, a memory, and a processing unit communicatively coupled with the wireless communication interface and the memory, and configured to cause the UE to receive, using the wireless communication interface, a first Long Term Evolution (LTE) Positioning Protocol (LPP) message from a location server, where the first LPP message comprises a location request and is received via a serving Fifth Generation (5G) base station. The processing unit is further configured to cause the UE to obtain, using the wireless communication interface, at least one location measurement based on the first LPP message, where the at least one location measurement comprises a measurement for a Radio Access Technology (RAT)-independent position method or a measurement for an Evolved Universal Terrestrial Radio Access (E-UTRA) position method. The processing unit is also configured to cause the UE to determine location information based on the at least one location measurement, and send, using the wireless communication interface, a second LPP message to the location server, where the second LPP message comprises the location information and is sent via the serving 5G base station.

Alternative embodiments of a UE may include one or more the following features. The processing unit may be further configured to cause the UE to determine the location information by determining a location estimate for the UE. The processing unit may be configured to cause the UE to obtain the at least one location measurement comprising the measurement for the RAT-independent position method, where the RAT-independent position method may comprise Assisted Global Navigation Satellite System (A-GNSS), Real Time Kinematics (RTK), Precise Point Positioning (PPP), Differential A-GNSS, Wireless Local Area Network (WLAN), Bluetooth, Sensors, or any combination thereof. The processing unit may be configured to cause the UE to obtain the at least one location measurement comprising the measurement for the E-UTRA position method, where the E-UTRA position method may comprise Observed Time Difference Of Arrival (OTDOA) for E-UTRA or Enhanced Cell ID (ECID) for E-UTRA, or any combination thereof. The processing unit may be further configured to cause the UE to receive, using the wireless communication interface, a third LPP message from the location server, where the third LPP message comprises assistance data for the RAT-independent position method or the E-UTRA position method and is received via the serving 5G base station, and obtain the at least one location measurement based on the assistance data. The processing unit may be further configured to cause the UE to receive the third LPP message comprising an LPP Provide Assistance Data message. The processing unit may be further configured to cause the UE to send, using the wireless communication interface, a request for measurement gaps to the serving 5G base station, and obtain the at least one location measurement during a measurement gap. The processing unit may be configured to cause the UE to send the request for measurement gaps using an NR Radio Resource Control (RRC) message. The at least one location measurement may comprise a Reference Signal Time Difference (RSTD) measurement for OTDOA for E-UTRA, and the processing unit may be configured to cause the UE to send, using the wireless communication interface, a request for an idle period to the serving 5G base station, obtain LTE timing and a System Frame Number (SFN) for an OTDOA reference cell during the idle period, and base the request for measurement gaps on the LTE timing and the SFN. The processing unit may be further configured to cause the UE to receive, using the wireless communication interface, a fourth LPP message from the location server, where the fourth LPP message comprises a request for LPP positioning capabilities of the UE and is received via the serving 5G base station, and send, using the wireless communication interface, a fifth LPP message to the location server, where the fifth LPP message comprises the LPP positioning capabilities of the UE when the UE has NR wireless access and is sent via the serving 5G base station. The processing unit may be further configured to cause the UE to send, using the wireless communication interface, an indication to an Access Management Function (AMF), where the indication indicates that the UE supports LPP with NR wireless access, wherein the AMF transfers the indication to the location server.

An example device, according to the description, comprises means for receiving a first Long Term Evolution (LTE) Positioning Protocol (LPP) message from a location server, where the first LPP message comprises a location request and is received via a serving Fifth Generation (5G) base station. The example device further comprises means for obtaining at least one location measurement based on the first LPP message, where the at least one location measurement comprises a measurement for a Radio Access Technology (RAT)-independent position method or a measurement for an Evolved Universal Terrestrial Radio Access (E-UTRA) position method. The example device also comprises means for determining location information based on the at least one location measurement, and means for sending a second LPP message to the location server, where the second LPP message comprises the location information and is sent via the serving 5G base station. Alternative embodiments may include any of a variety of additional functions. For example, in some embodiments, the location information may comprise a location estimate for the device.

An example non-transitory computer-readable medium, according to the description, has instructions embedded thereon to cause a user equipment (UE) to support location of the UE with Fifth Generation (5G) New Radio (NR) wireless access. The instructions are further configured to, when executed by a processing unit of the UE, cause the UE to receive a first Long Term Evolution (LTE) Positioning Protocol (LPP) message from a location server, where the first LPP message comprises a location request and is received via a serving 5G base station. Instructions are further configured to cause the UE to obtain at least one location measurement based on the first LPP message, where the at least one location measurement comprises a measurement for a Radio Access Technology (RAT)-independent position method or a measurement for an Evolved Universal Terrestrial Radio Access (E-UTRA) position method. The instructions are also configured to cause the UE to determine location information based on the at least one location measurement, and send a second LPP message to the location server, where the second LPP message comprises the location information and is sent via the serving 5G base station.

BRIEF DESCRIPTION OF DRAWINGS

Non-limiting and non-exhaustive aspects are described with reference to the following figures, wherein like reference numerals refer to like parts throughout the various figures unless otherwise specified.

Figure 1:
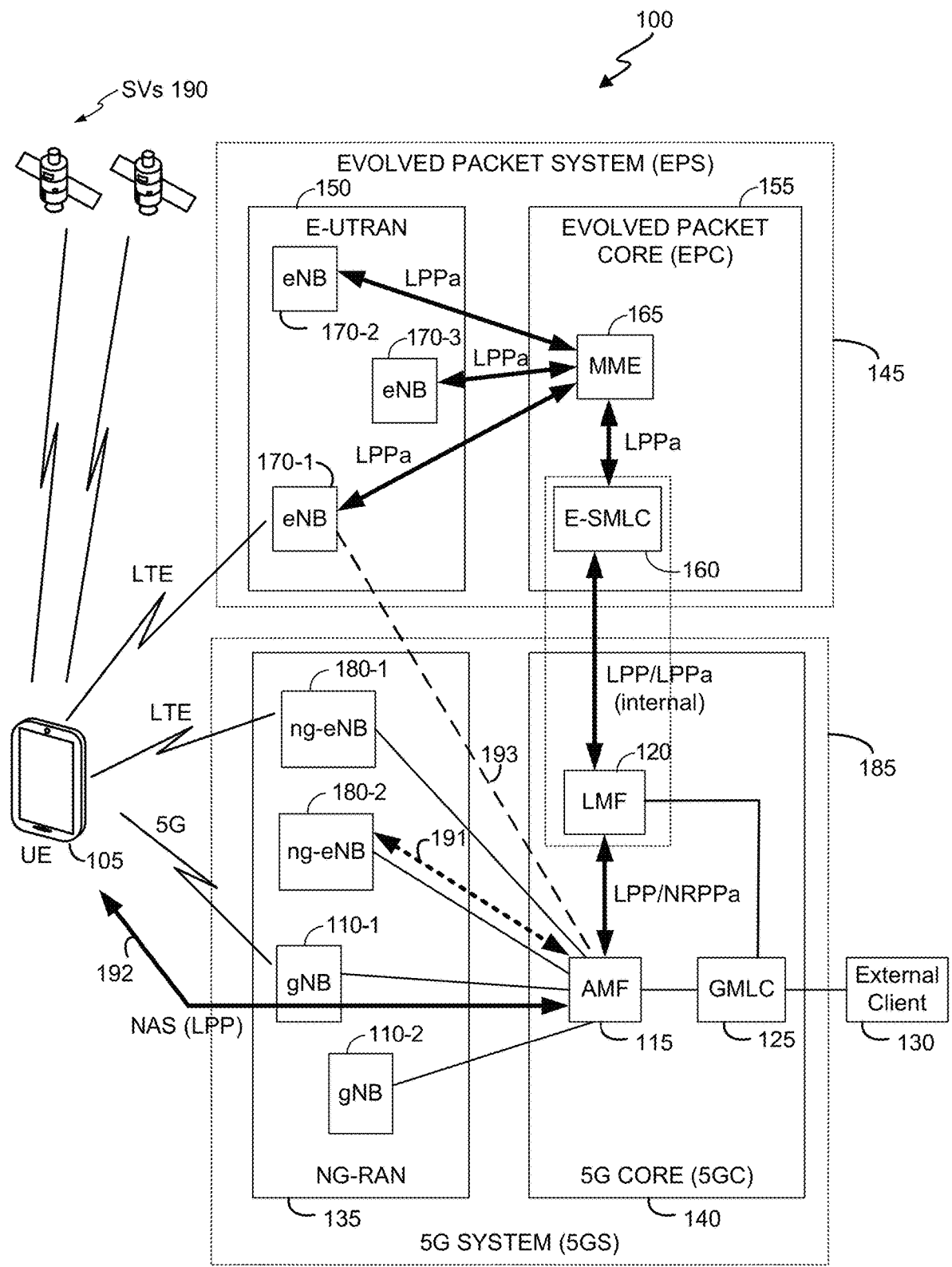
FIG. 1 is a diagram of a communication system, according to an embodiment.

Elements, stages, steps and actions with the same reference label in different drawings may correspond to one another (e.g. may be similar or identical to one another). Further, some elements in the various drawings are labelled using a numeric prefix followed by an alphabetic or numeric suffix. Elements with the same numeric prefix but different suffices may be different instances of the same type of element. The numeric prefix without any suffix is then used herein to reference any element with this numeric prefix. For example, different instances 170, 170-2, and 170-3 of an evolved Node B (eNB) are shown in FIG. 1. A reference to an eNB 170 may then refer to any of eNB 170-1, eNB 170-2, and 170-3.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Techniques described herein are directed to providing location support for a UE that has wireless access to an NG-RAN. According to some embodiments, such a UE (with wireless access to an NG-RAN) may be located using (i) Radio Access Technology (RAT)-independent position methods (e.g., Assisted Global Navigation Satellite System (A-GNSS), WiFi, Bluetooth, sensors, etc.), and/or (ii) RAT-dependent position methods for Evolved Universal Terrestrial Radio Access (E-UTRA) (e.g., Enhanced Cell ID (ECID), Observed Time Difference Of Arrival (OTDOA), etc.), which do not depend on new types of location support for 5G wireless access. To manage the UE's location, the LTE Positioning Protocol (LPP) defined for supporting UE location over LTE in 3GPP Technical Specification (TS) 36.355 may be reused (with little or no change) for 5G wireless access by the UE. This may be enabled by transferring LPP messages between a UE and a 5GC location server (e.g. a Location Management Function (LMF)) using a transport protocol such as a 5G Non-Access Stratum (NAS) protocol (referred to herein as 5G NAS). Transport (e.g., 5G NAS) messages that are used to transport messages for other services (e.g., network access, mobility management, session management) may be transferred between an Access Management Function (AMF) in the 5GC and a UE via the NG-RAN as part of normal 5G operation. A suitable transport (e.g. 5G NAS) message or messages may then carry LPP messages between a UE and AMF with little or no extra impact to the NG-RAN. LPP messages may be transferred between an AMF and an LMF using a new 5GC protocol. The new 5GC protocol may be similar to the Location Services (LCS) Application Protocol (LCS AP) defined in 3GPP TS 29.171 that is used between a Mobility Management Function (MME) and an Enhanced Serving Mobile Location Center (E-SMLC) to support location of a UE with 4G (LTE) wireless access. This new 5GC protocol (for communication between an AMF and LMF) is referred to herein as "5G LCS AP". The AMF may also tell the LMF (e.g., using the 5G LCS AP) that a UE has 5G wireless access and may provide the 5G serving cell ID to the LMF.

The use of LPP in the manner described above may allow existing positioning methods supported by LPP for LTE access by a UE to be reused for locating a UE with 5G wireless access. In some embodiments, for RAT-independent position methods, existing UE support may be reused, and/or part of the procedure described below in P1 to P4 may be used to allow a UE to make RAT-independent position measurements. In embodiments using E-UTRA RAT-dependent position methods (e.g. ECID and/or OTDOA), a UE may be able to tune away from 5G wireless access to make LTE measurements. In such embodiments, the procedure described below in P1 to P4 may be used.

P1. The UE may request a short idle period (e.g., 10-50 milliseconds (ms)) from the serving 5G base station (referred to herein as a gNB)—e.g., using a 5G Radio Resource Control (RRC) protocol.

P2. The UE may tune away from 5G wireless access during the idle period and acquire LTE timing (e.g., LTE System Frame Number (SFN) and subframe boundaries) for a particular reference cell indicated by the LMF in LPP assistance data (AD) previously provided by the LMF to the UE.

P3. The UE may use the acquired LTE timing from P2 and the already known 5G timing from previous 5G wireless access to determine a series of periodic measurement gaps (e.g., lasting 6 ms each) in terms of 5G timing. For OTDOA for E-UTRA, the measurement gaps can correspond to Positioning Reference Signals (PRS) positioning occasions for LTE reference and neighbor cells provided to the UE as OTDOA AD by an LMF (and as further described herein in association with FIGS. 6 and 7). The UE may determine a 5G signaling boundary such as the start of a 5G radio frame or 5G subframe coinciding with the start of the first measurement gap. The UE may then send a request for the measurement gaps to the serving gNB—e.g., using a 5G RRC protocol. This request may be assumed to be accepted by the gNB or may be confirmed by the gNB (e.g., via a 5G RRC response message).

P4. The UE may tune away from 5G wireless access during each measurement gap and obtain one or more LTE measurements (e.g., Reference Signal Time Difference (RSTD) measurements for OTDOA).

Measurements obtained by the UE (e.g. as described above in P1-P4) may be returned to the LMF in an LPP message (e.g., sent to the AMF in a NAS transport message and sent by the AMF to the LMF using 5G LCS AP).

These techniques can have limited impact to UEs and zero or low impact to the NG-RAN if a request for an idle period and measurement gaps is supported by the NG-RAN for other types of measurements (e.g., 5G measurements to support cell change and handover). Additional details and embodiments are described below, with reference to the appended figures.

FIG. 1 is a diagram of a communication system 100 capable of implementing the techniques described herein, according to an embodiment. Here, the communication system 100 comprises a user equipment (UE) 105, components of a 5G System (5GS) 185 comprising an NG-RAN 135 and 5GC 140. NG-RAN 135 may also be referred to as a 5G Radio Access Network (5G RAN) or as a Radio Access Network (RAN) for NR. The communication system 100 further comprises components of an evolved packet system (EPS) 145 supporting LTE wireless access, which includes an Evolved Universal Terrestrial Radio Access (E-UTRA) Network (E-UTRAN) 150 and an Evolved Packet Core (EPC) 155. The communication system 100 may further utilize information from GNSS satellite vehicles (SVs) 190. Additional components of the communication system 100 are described below. It will be understood that a communication system 100 may include additional or alternative components. EPS 145 may belong to or be managed by the same network operator who manages or owns 5GS 185 in some embodiments (or may be managed or owned by a different network operator in other embodiments).

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, eNBs 170, gNBs 110, ng-eNBs 180, external clients 130, and/or other components. A person of ordinary skill in the art will recognize many modifications to the components illustrated. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to herein as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, personal digital assistant (PDA), tracking device or some other portable or moveable device. Typically, though not necessarily, the UE 105 may support wireless communication using one or more Radio Access Technologies (RATs) such as using GSM, Code Division Multiple Access (CDMA), Wideband CDMA (WCDMA), LTE (e.g., the EPS 145), High Rate Packet Data (HRPD), IEEE 802.11 WiFi (also referred to as Wi-Fi), Bluetooth® (BT), Worldwide Interoperability for Microwave Access (WiMAX), 5G new radio (NR) also referred to as just "5G" (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of or more of these RATs may enable the UE 105 to communicate with an external client 130 (via elements of 5GC 140 not shown in FIG. 1 or possibly via Gateway Mobile Location Center (GMLC) 125) and/or enable the external client 130 to receive location information regarding the UE 105 (e.g. via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise.

Base stations in the E-UTRAN 150 (a 4G RAN) comprise Evolved Node Bs (eNodeBs or eNBs) 170-1, 170-2, and 170-3 (collectively and generically referred to herein as eNBs 170). Base stations in the NG-RAN 135 comprise NR NodeBs (gNBs) 110-1 and 110-2 (collectively and generically referred to herein as gNBs 110) and next generation eNBs (ng-eNBs) 180-1 and 180-2 (collectively and generically referred to herein as ng-NBs 180). Access to the LTE network supported by EPS 145 is provided to UE 105 via wireless communication between the UE 105 and one or more of the eNBs 170. The eNBs 170 may provide wireless communications access to the EPC 155 on behalf of UE 105 using LTE. Similarly, access to the 5GS 185 is provided to UE 105 via wireless communication between the UE 105 and one or more of the gNBs 110, which may provide wireless communications access to the 5GS 185 using 5G NR. In some embodiments, access to the 5GS 185 is provided to UE 105 via wireless communication between the UE 105 and one or more of the ng-eNBs 180, which may provide wireless communications access to the 5GS 185 using LTE. Ng-eNBs 180 may provide LTE wireless access to UE 105 that is similar to or the same as LTE wireless access provided to UE 105 by eNBs 170 at a physical level. Furthermore, in some embodiments, NG-RAN 135 may contain gNBs 110 but no ng-eNBs 180 or may contain ng-eNBs 180 but no gNBs 110. In addition, in some embodiments, EPS 145 may be absent.

In communication system 100, location support for UE 105 may employ LPP transport between an LMF 120 and UE 105 using transport protocols such as a 5G NAS protocol and 5G LCS AP as described previously. Use of LPP and transport of LPP may be similar or the same both for access by UE 105 to 5GC 140 via gNBs 110 and for access by UE 105 to 5GC 140 via ng-eNBs 180.

For LTE wireless access, the EPC 155 comprises a Mobility Management Entity (MME) 165, which can function as the main signaling node in the EPC 155, and may support mobility of UE 105 and provision of signaling access and voice bearer paths to UE 105. For positioning functionality, the MME 165 can relay information to and from an Enhanced Serving Mobile Location Center (E-SMLC) 160. E-SMLC 160 may support positioning of UE 105 (also referred to as location of UE 105) when UE 105 accesses E-UTRAN 150 and may support position methods such as Assisted GNSS (A-GNSS), OTDOA, ECID, Real Time Kinematics (RTK) and/or WLAN positioning (also referred to as WiFi positioning) which are well known in the art. E-SMLC 160 may also process location services requests for UE 105—e.g. received from MME 165. EPC 155 may contain other elements not shown in FIG. 1 such as a Packet Data Network (PDN) Gateway and/or a GMLC, for example.

For NR (5G) wireless access, the gNBs 110 can communicate directly or indirectly with an Access Management Function (AMF) 115, which, for position functionality, communicates with the LMF 120. Similarly, for LTE wireless access to NG-RAN 135, the ng-eNBs 180 can communicate directly or indirectly with the AMF 115. Further, gNBs 110 and/or ng-eNBs 180 may communicate directly with one another which may allow some gNBs 110 and/or some ng-eNBs 180 to communicate only indirectly with AMF 115 via one or more other gNBs 110 and/or ng-eNBs 180. AMF 115 may support mobility of UE 105 including cell change and handover and may participate in supporting a signaling connection to UE 105 and possibly helping to establish data and voice bearers for UE 105. LMF 120 may support positioning of UE 105 when UE accesses NG-RAN 135 and may support position methods such as Assisted GNSS (A-GNSS), OTDOA, ECID, RTK and/or WLAN positioning similar to E-SMLC 160. LMF 120 may also process location services requests for UE 105—e.g. received from AMF 115 or from GMLC 125. In some embodiments, the LMF 120 may implement functionality similar to an E-SMLC such as E-SMLC 160 that would enable the LMF 120 to query eNBs 170 in the E-UTRAN 150 (e.g. using the LTE Positioning Protocol A (LPPa) defined in 3GPP TS 36.455) and obtain assistance data from the eNBs 170 to support OTDOA positioning of the UE 105 when UE 105 has NR or LTE wireless access via NG-RAN 135. Additionally or alternatively, this functionality may be enabled via the E-SMLC 160. For example, LMF 120 may be combined with E-SMLC 160 in the same physical entity or may have communication access to E-SMLC 160.

As illustrated in FIG. 1, LMF 120 and eNBs 170 may communicate using LPPa, wherein LPPa messages are transferred between eNBs 170 and LMF 120 via MME 165 and E-SMLC 160. Here, LPPa transport between E-SMLC 160 and eNBs 170 (via MME 165) may be as defined for existing LTE location in 3GPP TS 36.305 and transport of LPPa messages between E-SMLC 160 and LMF 120 may be internal (e.g., if LMF 120 and E-SMLC 160 are combined) or may use a proprietary protocol if LMF 120 and E-SMLC 160 are separate. In embodiments where UE 105 accesses 5GC 140 via LTE access to an ng-eNB 180 in NG-RAN 135, messages similar to LPPa may be transferred between ng-eNBs 180 and LMF 120 via AMF 115 (as shown by the dashed arrow 191 in FIG. 1). The messages similar to LPPa transferred as shown by the dashed arrow 191 may be messages for an NR Positioning Protocol A (NRPPa) defined in 3GPP TS 38.455 which may support transfer of information identical to or similar to that transferred using LPPa.

As further shown in FIG. 1, LPP messages may be exchanged between UE 105 and LMF 120 via AMF 115 and NG-RAN 135 (e.g., via either gNB 110-1 or ng-eNB 180-1 in NG-RAN 135) as shown by the solid arrow 192 in FIG. 1, For example, LPP messages may be transferred between LMF 120 and AMF 115 using a 5G LCS Application Protocol (AP) and may be transferred between AMF 115 and UE 105, via a serving gNB 110 or serving ng-eNB 180 for UE 105, using 5G NAS. Because the AMF 115 can relay LPP communication to and from UE 105 inside a 5G NAS message, the LPP communication may have little or no impact on the NG-RAN 135 (which may communicate the 5G NAS message as it would any other 5G NAS message).

The LPPa and NRPPa protocols may enable a location server to request and obtain location related information from a base station concerning either the location of a particular UE or location configuration for the base station. Location related information provided by the eNBs 170 to LMF 120 (e.g. via E-SMLC 160 and MME 165) using LPPa may include timing information, information for PRS transmission by eNBs 170 (as described later in association with FIGS. 6 and 7), and location coordinates for eNBs 170. Similarly, location related information provided by the ng-eNBs 180 to LMF 120 using NRPPa may include timing information, information for PRS transmission by ng-eNBs 180 (as described later in association with FIGS. 6 and 7), and location coordinates for ng-eNBs 180. For example, in the case of LPPa, E-SMLC 160 or LMF 120 may send an LPPa message to eNB 170-1 via MME 165 (and possibly via E-SMLC 160 in the case of an LPPa message sent from LMF 120) to request information related to the location of UE 105 (e.g. such as location measurements for ECID positioning obtained by eNB 170-1 or obtained by UE 105 and transferred to eNB 170-1) or related to a location configuration of eNB 170-1 (e.g. such as a location of eNB 170-1 or a PRS configuration for eNB 170-1 for OTDOA positioning). ENB 170-1 may then obtain any requested location configuration information or location measurements (e.g. when location information for UE 105 is requested) and return the requested information back to E-SMLC 160 or LMF 120 via MME 165 (and possibly via E-SMLC 160 when the information was requested by LMF 120). Use of NRPPa may occur in a similar manner with, for example, LMF 120 sending an NRPPa message to gNB 110-1 or to ng-eNB 180-1 via AMF 115 to request information related to the location of UE 105 or location configuration for gNB 110-1 or ng-eNB 180-1, and with gNB 110-1 or ng-eNB 180-1 returning the requested information back to LMF 120 in another NRPPa message via AMF 115.

In the case of an NRPPa message sent to ng-eNB 180-1, LMF 120 may request information similar to or the same as that which can be requested from eNB 170-1 using LPPa: this information may thus comprise ECID location measurements for UE 105, the location of ng-eNB 180-1 or PRS configuration information for ng-eNB 180-1 applicable to OTDOA positioning of UE 105. In the case of an NRPPa message sent to gNB 110-1, LMF 120 may request a serving cell identity (ID) for UE 105 or location measurements (e.g.

measurements of Reference Signal Received Power (RSRP) or Reference Signal Received Quality (RSRQ) for LTE) obtained by UE 105 and provided to gNB 110-1 by UE 105 (e.g. using RRC). LMF 120 may also request (e.g. in a later 3GPP release), NR related location measurements obtained by gNB 110-1 for UE 105 or location configuration information for gNB 110-1 such as NR PRS configuration information for gNB 110-1.

The LMF 120 can provide some or all of the location related information received (e.g. using LPPa and/or NRPPa) from eNBs 170, ng-eNBs 180 and/or gNBs 110 to the UE 105 as assistance data in an LPP message sent to the UE 105 via the NG-RAN 135 and 5GC 140.

An LPP message communicated from the LMF 120 to the UE 105 (e.g. via NG-RAN 135) may instruct the UE 105 to do any of a variety of things, depending on desired functionality. For example, the LPP message could contain an instruction for the UE 105 to obtain measurements for GNSS (or A-GNSS), WLAN positioning, RTK, and/or OTDOA. In the case of OTDOA, the LPP message may tell the UE 105 to take one or more measurements (e.g. measurements of Reference Signal Time Difference (RSTD)) of particular eNBs 170 and/or ng-eNBs 180. Thus, if the UE 105 is served by a gNB 110 or ng-eNB 180 in NG-RAN 135, the UE 105 could behave as if it were being served by E-UTRAN 150 and EPC 155 (rather than by NG-RAN 135 and 5GC 140) in the case of measurements of particular eNBs 170. Similarly, if the UE 105 is served by a gNB 110 in NG-RAN 135, the UE 105 could behave as if it were being served by an ng-eNB 180 in NG-RAN 135 in the case of measurements of particular ng-eNBs 180. The UE 105 may then send measurements back to the LMF 120 in an LPP message (e.g., inside a 5G NAS message) via the NG-RAN 135.

It is noted that identification of ng-eNBs 180 as part of NG-RAN 135 in FIG. 1 is partly a matter of terminology. For example, an ng-eNB 180-1 could be treated as being part of E-UTRAN 150 rather than as part of NG-RAN 135 and could be referred to as an eNB 170-1 rather than as an ng-eNB 180-1. Such an eNB 170-1 could still be connected to AMF 115 rather than to MME 165, as indicated by the dashed line 193, to provide LTE wireless access to a UE 105 via 5GC 140 rather than via EPC 155. In that case, the eNB 170-1 could function exactly the same as the ng-eNB 180-1. In such a case, the eNB 170-1 could communicate with LMF 120 using NRPPa (or LPPa) rather than with E-SMLC 120 using LPPa, where NRPPa (or LPPa) messages may be transferred between eNB 170-1 and LMF 120 via AMF 115 and possibly via a gNB 110 (e.g. gNB 110-1) as described later with reference to FIG. 2 for when UE 105 is served by ng-eNB 180-1. Similarly, when UE 105 is served by eNB 170-1, with eNB 170-1 providing LTE access to 5GC 140 rather than to EPC 155, LPP messages may be transferred between UE 105 and LMF 120 via AMF 115, eNB 170-1 and possibly a gNB 110 (e.g. gNB 110-1) similarly to that described later in association with FIG. 2 for LPP message transfer when UE 105 is served by ng-eNB 180-1.

Figure 2:
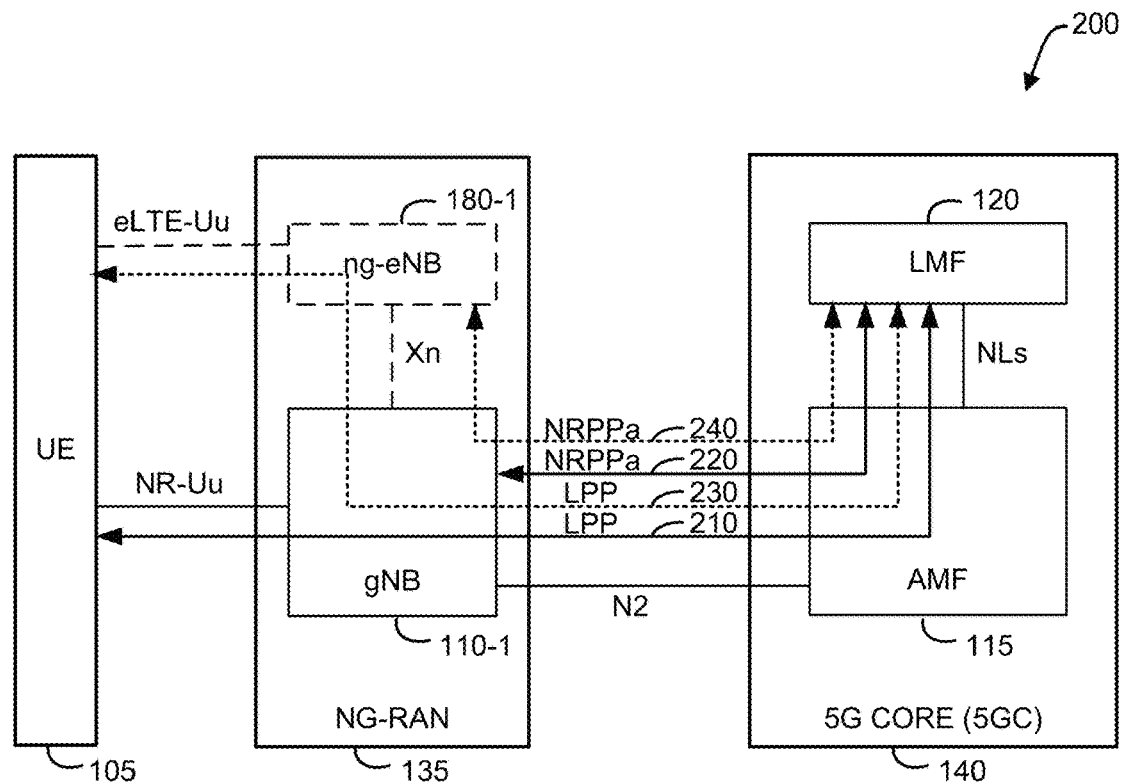
FIGS. 2 and 3 are illustrative examples of communication systems with different architectures that may implement the techniques herein, according to some embodiments.
Figure 3:
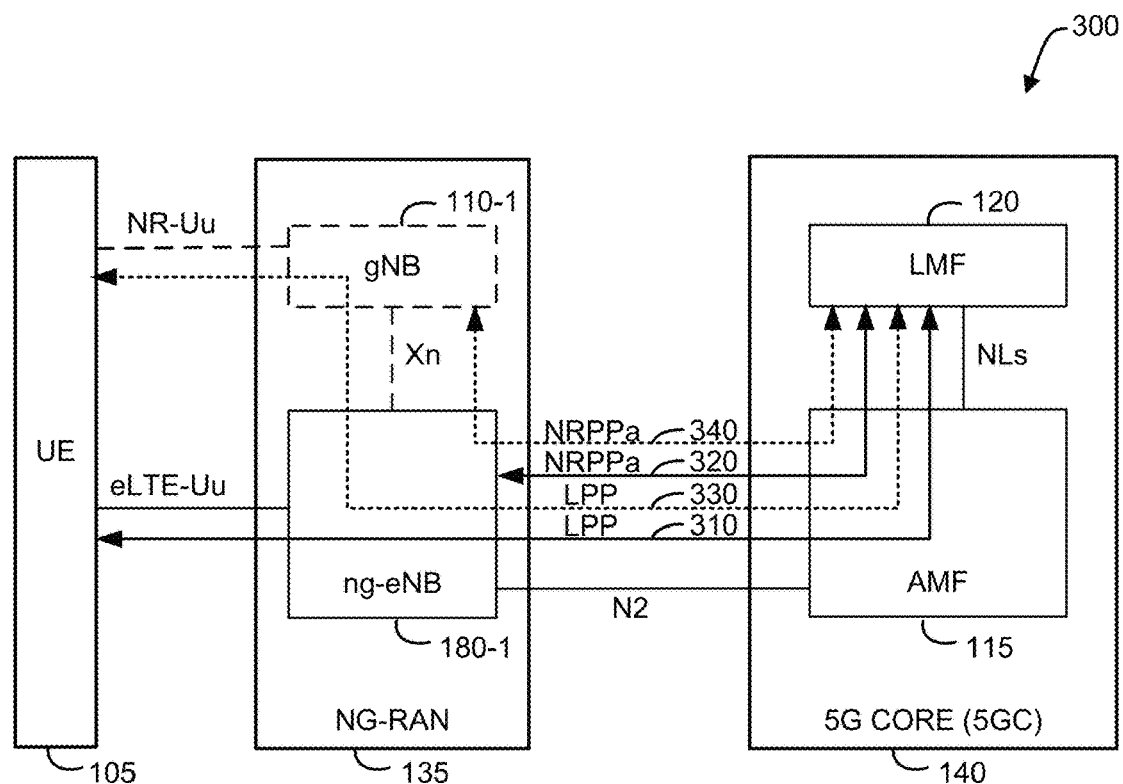

As previously indicated, embodiments of the techniques provided herein can be utilized in systems having different architectures. FIGS. 2 and 3 are illustrative examples of communication systems 200 and 300, respectively, showing different architectures that may implement the techniques herein, according to some embodiments. The different architectures illustrated by FIGS. 2 and 3 provide different base station arrangements for NG-RAN 135 and different ways of connecting base stations in NG-RAN 135 to 5GC 140 for communication system 100. Thus, communication systems 200 and 300 can represent different variants of communication system 100. Components of the communication systems 200 and 300 correspond to those illustrated in the communication system 100 illustrated in FIG. 1 and described above. These components include the UE 105, ng-eNB 180-1, gNB 110-1, NG-RAN 135, 5GC 140, AMF 115, and LMF 120. Optional components, interfaces and protocols are illustrated with dashed lines, as described in more detail below. Here, an NR interface (NR-Uu), an LTE or enhanced or evolved LTE interface (eLTE-Uu), an AMF to NG-RAN interface (N2), an AMF to LMF interface (NLs), and a gNB to ng-eNB interface (Xn) (which may also be a gNB to gNB and a ng-eNB to ng-eNB interface) are shown as dashed or solid lines between components. Protocols LPP and NRPPa that are used between a pair of components are further illustrated by dashed and solid double arrows, where each arrow joins the pair of components. An arrow passing through an intermediate component illustrates where the intermediate component can relay messages for the protocol illustrated by the arrow. For example, as illustrated, all communication in FIGS. 2 and 3 between the LMF 120 and other components are relayed via the AMF 115 which acts as an intermediate component. It will be understood by a person of ordinary skill in the art that the architectures illustrated in FIGS. 2-3 may include additional and/alternative components (such as GMLC 125 and external client 130 of FIG. 1), which are not illustrated. Moreover, it can be further noted that, although an NG-RAN 135 and 5GC 140 are illustrated, embodiments described herein may be implemented with other RAN and/or CORE components.

In communication system 200 in FIG. 2, gNBs 110 are present in NG-RAN 135 and connect directly to AMFs in 5GC 140, as exemplified by connection of gNB 110-1 in NG-RAN 135 to AMF 115 in 5GC 140. When ng-eNBs 180 (e.g. the optional ng-eNB 180-1) are not present in NG-RAN 135, communication system 200 may be referred to as a standalone 5G (or NR) architecture, also referred to in 3GPP as "Option 2". With this arrangement or option, LPP messages 210 can be exchanged between UE 105 and LMF 120 via gNB 110-1 and AMF 115, and NRPPa messages 220 can be exchanged between gNB 110-1 and LMF 120 via AMF 115. When ng-eNBs 180 (e.g. the optional ng-eNB 180-1) are present in NG-RAN 135, communication system 200 may be referred to as a standalone 5G (or NR) with non-standalone E-UTRA architecture, also referred to in 3GPP as "Option 4". With this arrangement or option, when UE 105 is served by ng-eNB 180-1, LPP messages 230 can be exchanged between UE 105 and LMF 120 via gNB 110-1, ng-eNB 180-1 and AMF 115, and NRPPa messages 240 can be exchanged between ng-eNB 180-1 and LMF 120 via gNB 110-1 and AMF 115. With this (Option 4) arrangement, LPP and NRPPa messages may not be transferred directly between AMF 115 and ng-eNB 180-1 but may instead be transferred via gNB 110-1 using the Xn interface to transfer the messages between gNB 110-1 and ng-eNB 180-1.

FIG. 3, similar to FIG. 2, illustrates different embodiments that can be implemented depending on desired functionality. Here, however, the roles of gNB 110-1 and ng-eNB 180-1 are reversed. Thus, in communication system 300, ng-eNBs 180 are present in NG-RAN 135 and connect directly to AMFs in 5GC 140, as exemplified by connection of ng-eNB 180-1 in NG-RAN 135 to AMF 115 in 5GC 140. When gNBs 110 (e.g. the optional gNB 110-1) are not present in NG-RAN 135, communication system 300 may be referred to as a standalone E-UTRA 5GS architecture, also referred to in 3GPP as "Option 5". With this arrangement or option, LPP messages 310 can be exchanged between UE 105 and LMF 120 via ng-eNB 180-1 and AMF 115, and NRPPa messages 320 can be exchanged between ng-eNB 180-1 and LMF 120 via AMF 115. When gNBs 110 (e.g. the optional gNB 110-1) are present in NG-RAN 135, communication system 300 may be referred to as a stand-alone E-UTRA with non-standalone NR architecture, also referred to in 3GPP as "Option 7". With this arrangement or option, when UE 105 is served by gNB 110-1, LPP messages 330 can be exchanged between UE 105 and LMF 120 via gNB 110-1, ng-eNB 180-1 and AMF 115, and NRPPa messages 340 can be exchanged between gNB 110-1 and LMF 120 via ng-eNB 180-1 and AMF 115. With this (Option 7) arrangement, LPP and NRPPa messages may not be transferred directly between AMF 115 and gNB 110-1 but may instead be transferred via ng-eNB 180-1 using the Xn interface to transfer the messages between gNB 110-1 and ng-eNB 180-1.

It can be noted that use of the existing LPP protocol for positioning of UE 105 with access to NG-RAN 135 as described and illustrated previously with reference to FIGS. 1-3 could be adapted or replaced by new or modified protocols for NG-RAN 135 (or another RAN, if utilized). In some embodiments, adaptations might include an extension of LPP or a replacement of LPP which may be needed to support position methods in which UE 105 obtains measurements of NR signals transmitted by one or more gNBs 110. Such NR related measurements could include measurements of RSRP, RSRQ, RSTD, round trip signal propagation time (RTT) and/or angle of arrival (AOA). In one embodiment, referred to as Alternative A1, LPP may be extended to support new NR RAT-dependent (and possible other RAT-independent) position methods such as NR RAT-dependent position methods similar to OTDOA or ECID for LTE access. In another embodiment, referred to as Alternative A2, an entirely new protocol (e.g. an NR Positioning Protocol (NPP or NRPP)) may be defined to be used instead of LPP, where the new protocol provides support for NR RAT-dependent and other RAT-independent position methods. In a further embodiment, referred to as Alternative A3, a new protocol (e.g. NPP or NRPP) may be defined that is restricted to supporting NR RAT-dependent position methods only and is used in combination with LPP when both NR RAT-dependent and RAT-independent positioning (and/or LTE RAT-dependent positioning) are needed. Alternative A3 may use one of three variants. In a first variant of A3, a message for the new protocol may be embedded inside an LPP message as a new External Protocol Data Unit (EPDU) according to the definition of an EPDU in 3GPP TS 36.355. In a second variant of A3, an LPP message may be embedded inside a message for the new protocol, for example using an EPDU similar to the definition of an EPDU in 3GPP TS 36.355. In a third variant of A3, the new protocol may be separate from (e.g. not embedded within or capable of embedding) LPP, but with an LMF 120 and UE 105 able to exchange a message or messages for both the new protocol and LPP using the same NAS transport container. In another embodiment, referred to as Alternative A4, a new protocol may be defined that embeds portions of LPP to support RAT-independent position methods and/or E-UTRA RAT-dependent position methods (e.g. via importing Abstract Syntax Notation One (ASN.1) data types from LPP).

While the different alternatives A1 to A4 above may be most applicable to positioning a UE 105 with NR wireless access to a gNB 110 in NG-RAN 135, they also may be applicable to positioning a UE 105 with LTE access to an ng-eNB 180 in NG-RAN 135, due to the possibility of using NR RAT-dependent position methods for gNBs 110 nearby to UE 105 whose signals are measurable by UE 105.

Figure 4:
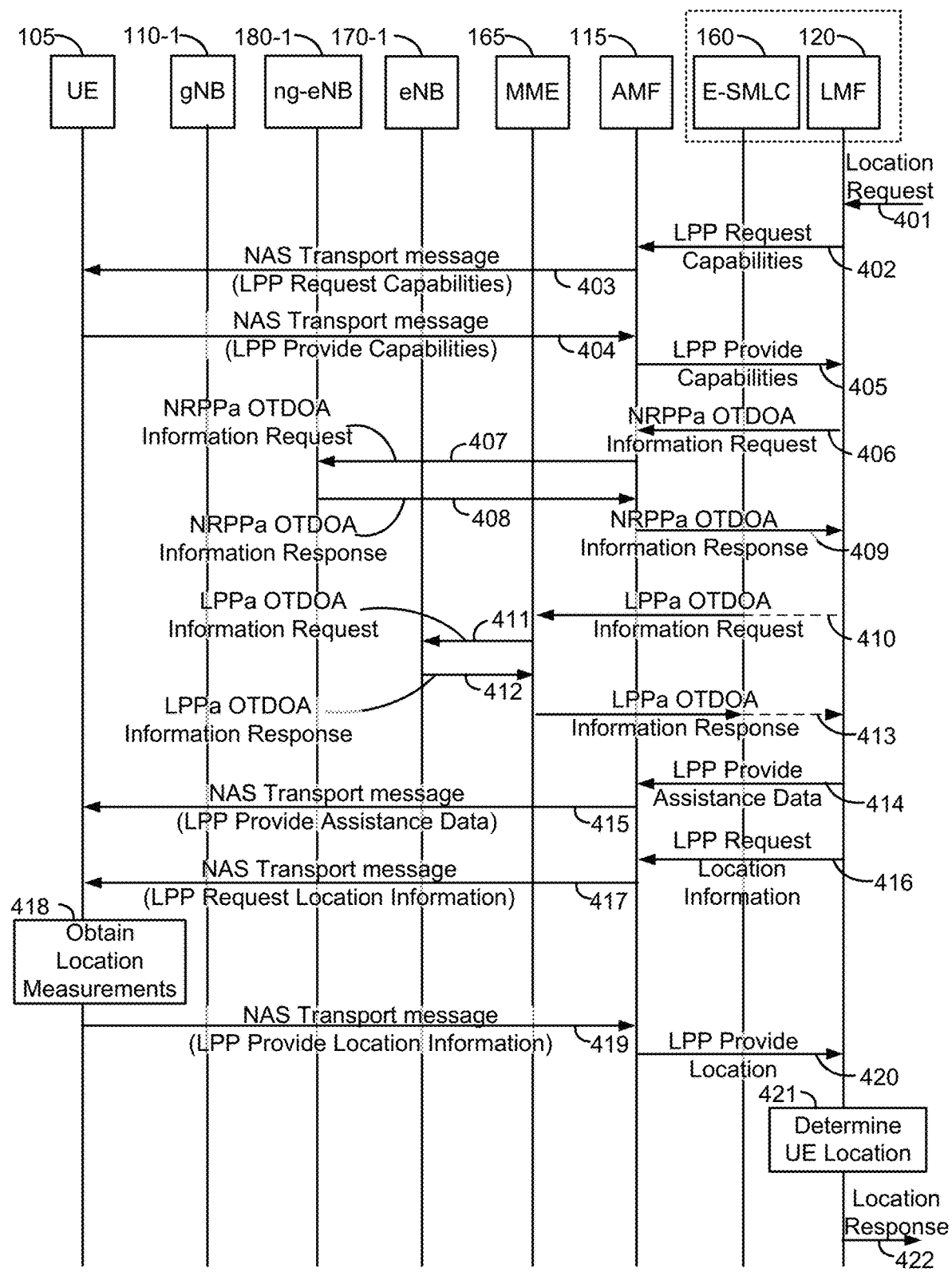
FIG. 4 is a signaling flow diagram illustrating the various messages sent between components of a communication system during an LPP location session, according to an embodiment.

FIG. 4 is a signaling flow diagram illustrating the various messages sent between components of the communication system 100 during a location session using LPP (also referred to as a session, an LPP session or an LPP location session) between the UE 105 and the LMF 120, according to an embodiment. The signaling flow in FIG. 4 may apply when UE 105 has NR (5G) wireless access to a gNB 110 in NG-RAN 135, which in the example in FIG. 4 is assumed to be gNB 110-1. The LPP session can be triggered by action 401, when the LMF 120 receives a location request for UE 105. Depending on the scenario and the type of location support in 5GC 140, the location request may come to the LMF 120, from the AMF 115, or from the GMLC 125. The LMF 120 may query AMF 115 for information for the UE 105 or the AMF 115 may send information for UE 105 to LMF 120 (e.g. if AMF 115 sends the location request at action 401 to LMF 120) (not shown in FIG. 4). The information may indicate that the UE 105 has NR wireless access to NG-RAN 135, may provide a current NR serving cell for UE 105 (e.g. a cell supported by gNB 110-1 which may be a serving gNB for UE 105) and/or may indicate that UE 105 supports location using LPP when UE 105 has NR wireless access (or when UE 105 has access to NG-RAN 135). Some or all of this information may have been obtained by AMF 115 from UE 105 and/or from gNB 110-1—e.g. when the UE 105 performs a registration with AMF 115 (e.g. using NAS).

To begin the LPP session (e.g. and based on an indication of UE 105 support for LPP with NR wireless access), the LMF 120 can send an LPP Request Capabilities message to the AMF 115 serving the UE 105 (e.g. using 5G LCS AP), at action 402. The AMF 115 may include the LPP Request Capabilities message within a 5G NAS transport message, which is sent to the UE 105 at action 403 (e.g., via a NAS communication path in the NG-RAN 135, as illustrated in FIGS. 1-3). The UE 105 may then respond to the AMF 115 by sending an LPP Provide Capabilities message to AMF 115, also within a 5G NAS transport message, at action 404. The AMF 115 may extract the LPP Provide Capabilities message from the 5G NAS transport message and relays the LPP provide capabilities message to the LMF 120 at action 405 (e.g. using 5G LCS AP).

Here, the LPP Provide Capabilities message sent at actions 404 and 405 can indicate the positioning capabilities of the UE 105 (e.g., position methods supported by the UE 105 such as A-GNSS positioning, RTK positioning, OTDOA positioning, ECID positioning, WLAN positioning, etc.) while accessing a 5G network using NR. This means that some of the positioning capabilities of the UE 105 could be different than when the UE 105 is accessing the EPC 155 via E-UTRAN 150 using LTE. For example, in some scenarios, although the UE 105 may have the capability of supporting OTDOA positioning for LTE (also referred to as OTDOA for E-UTRA) while accessing an LTE network, the UE 105 may not have the capability of supporting OTDOA positioning for LTE while accessing a 5G network using NR. If this is the case, then the UE 105 may not indicate in the LPP Provide Capabilities message sent at actions 404 and 405 that it has OTDOA positioning capabilities for LTE. In some other scenarios, UE 105 may be able to support LTE position methods such as OTDOA and/or ECID when accessing a 5G network using NR (e.g. based on the techniques described herein), in which case the LPP Provide Capabilities message sent at actions 404 and 405 may indicate this UE support. The positioning capabilities of UE 105 sent at actions 404 and 405 enable the LMF 120 to determine which capabilities the UE 105 has while accessing a 5G network.

With the positioning capabilities of the UE 105, the LMF 120 can determine assistance data for the UE 105 to support one or more of the position methods indicated by UE 105 as supported. For example, if UE 105 indicates support for OTDOA for LTE at actions 404 and 405, LMF 120 may send an NRPPa OTDOA Information Request message to an ng-eNB 180-1 at action 406 (relayed to the ng-eNB 180-1 via the AMF 115 at action 407). The ng-eNB 180-1 may respond with an NRPPa OTDOA Information Response at action 408 (relayed to the LMF 120 via the AMF 115 at action 409). LMF 120 may similarly send an LPPa OTDOA Information Request message to an eNB 170-1 at action 410 (relayed to the eNB 170-1 via the MME 165 at action 411). The eNB 170-1 may respond with an LPPa OTDOA Information Response at action 412 (relayed to the LMF 120 via the AMF 115 at action 413). It will be understood that similar communications between the LMF 120 and other eNBs 170 and/or other ng-eNBs 180 may occur to collect OTDOA assistance data and that in some scenarios, LMF 120 may request information (using LPPa) only from eNBs 170 or may request information (using NRPPa) only from ng-eNBs 180. Furthermore, as indicated in FIG. 4 and described for FIG. 1, communications between the eNBs 170 and the LMF 120 may be relayed via the E-SMLC 160. The information provided by each eNB 170 and each ng-eNB 180 to LMF 120 in an LPPa or NRPPa OTDOA Information Response (e.g. at actions 408-409 and 412-413) may include location coordinates of the eNB 170 or ng-eNB 180, PRS timing information and PRS configuration information (e.g. PRS configuration parameters) for the eNB 170 or ng-eNB 180, as described later for FIGS. 6 and 7.

The LMF 120 may then send some or all of the assistance data received at actions 409 and 413 to UE 105 (e.g. may send PRS configuration information for eNB 170-1 and/or ng-eNB 180-1) via an LPP Provide Assistance Data message sent to the AMF 115 at action 414, and relayed to the UE 105 in a 5G NAS transport message by AMF 115 at action 415. This may be followed by an LPP Request Location Information message, again sent from the LMF 120 to AMF 115, at action 416, which is relayed to the UE 105 in a 5G NAS transport message by AMF 115, and via gNB 110-1, at action 417. The LPP Request Location Information message may request one or more location measurements from UE 105 and/or a location estimate according to the position capabilities of UE 105 sent to LMF 120 at actions 404 and 405. The location measurements may for example include Reference Signal Time Difference (RSTD) measurements for OTDOA for LTE, pseudorange or code phase measurements for A-GNSS, carrier phase measurements for RTK, WiFi measurements for WLAN positioning, and/or measurements of AOA, RSRP and/or RSRQ for ECID for LTE (also referred to as ECID for E-UTRA).

In response, at block 418, the UE 105 may obtain some or all of the location measurements requested at actions 416 and 417. In some embodiments, and if requested at actions 416 and 417, UE 105 may also obtain a location estimate at block 418 based on the location measurements and possibly based also on some or all of the assistance data received at action 415. The location measurements or the location estimate may be provided in an LPP Provide Location message, which may be sent by the UE 105 to the AMF 115, via gNB 110-1, in a 5G NAS transport message at action 419. The AMF 115 may extract the LPP Provide Location message from the 5G NAS transport message, and relay it to the LMF 120 (e.g. using 5G LCS AP) at action 420. With this information, the LMF 120 may determine or verify the UE location, at block 421, and provide a location response containing the determined or verified location to the requesting entity at action 422.

In FIG. 4, the LMF 120 may request the UE 105 to obtain OTDOA RSTD measurements for LTE at actions 416 and 417, and the OTDOA RSTD measurements obtained at block 418 may be obtained from ng-eNBs 180 (e.g. ng-eNB 180-1) and/or from eNBs 170 (e.g. eNB 170-1). This may present an issue in cases when the carrier frequency used for LTE wireless access by ng-eNBs 180 and/or by eNBs 170 is different than the carrier frequency of the 5G network for NR wireless access or when simply measuring ng-eNB 180 and/or eNB 170 wireless signals (e.g., PRS signals) prevents or obstructs normal NR wireless access by UE 105. Moreover, LTE timing of ng-eNBs 180 in NG-RAN 135 and/or LTE timing of eNBs 170 in E-UTRAN 150 may be different than the timing used by gNBs 110 in NG-RAN 135, making RSTD measurements of PRS signals for OTDOA (e.g. as described for FIGS. 6 and 7) difficult or impossible for UE 105.

To address these issues, the UE 105 may be configured to tune away from NR access to gNB 110-1 for a period of time (e.g., for 10-50 ms) to enable UE 105 to look for and find a suitable reference LTE cell (e.g., supported by ng-eNB 180-1 or by eNB 170-1) that provides LTE coverage in the area of the UE 105. Information regarding a particular reference LTE cell may be provided to the UE 105 by the LMF 120 at actions 414 and 415. For example, prior to action 414, LMF 120 may determine the reference LTE cell based on the NR serving cell for the UE—e.g. by choosing an LTE reference cell that has a similar or same coverage area. The UE 105 may obtain LTE timing (e.g. an LTE System Frame Number (SFN)) and system information from the reference LTE cell. In order to allow the UE 105 a period of time to tune away, the UE 105 may request an idle period from the serving gNB 110-1. Additional details regarding this process are provided in FIG. 5.

Figure 5:
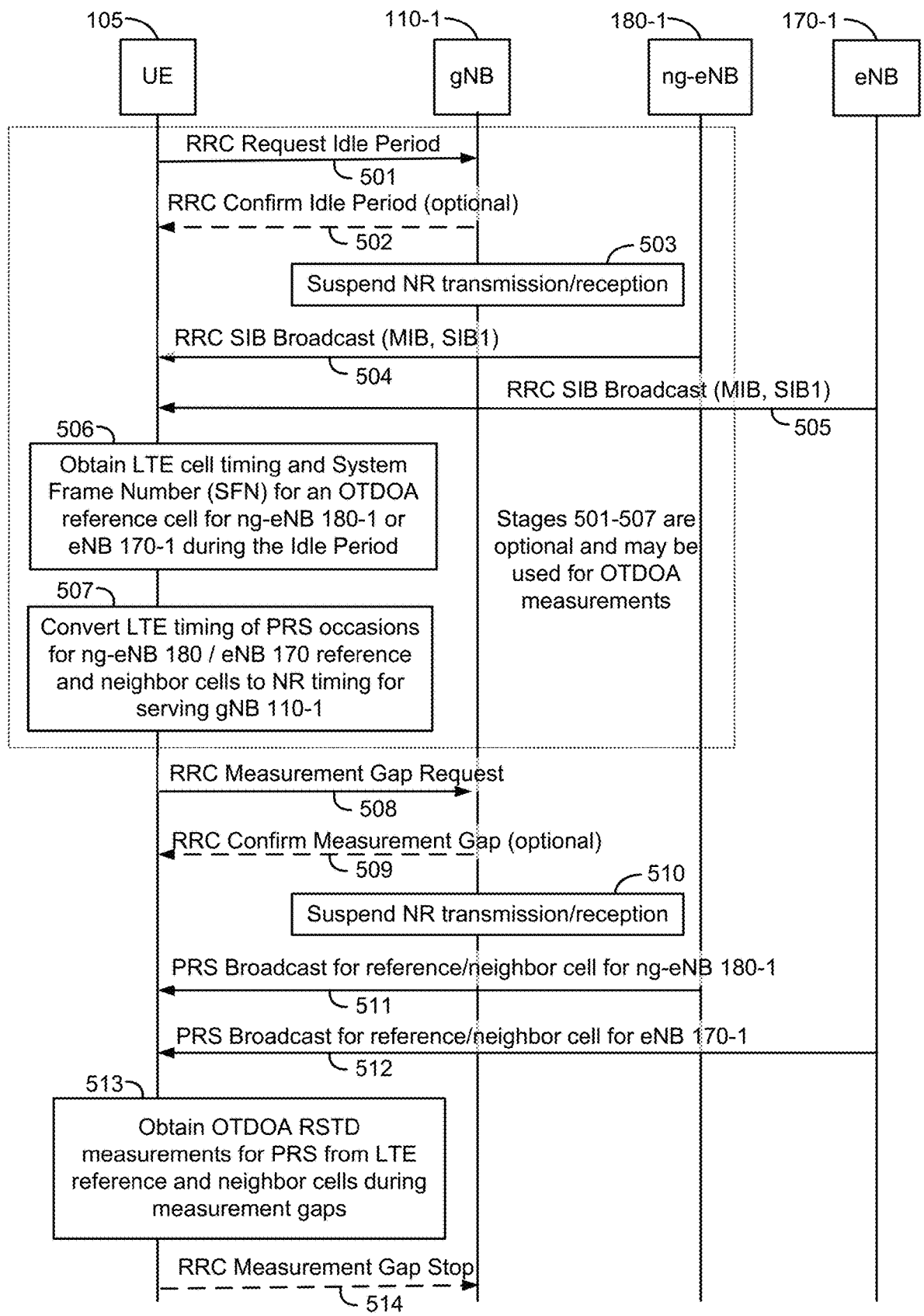
FIG. 5 is a signaling flow diagram illustrating further messages communicated between various components of a communication system, according to an embodiment.

FIG. 5 is a signaling flow diagram illustrating messages communicated between various components of communication system 100 enabling a UE 105 to tune away from NR wireless access for a serving gNB 110 in a 5G network in order to gather OTDOA timing information from ng-eNBs 180 and/or eNBs 170 in an LTE network, according to an embodiment. FIG. 5 may correspond to (e.g. may partially or fully support) block 418 in FIG. 4. It is noted that while FIG. 5 illustrates tuning away from NR wireless access to obtain OTDOA measurements for LTE, the same or a similar procedure could be used to enable a UE 105 to tune away from NR wireless access to obtain other types of location measurements such as measurements for ECID positioning for LTE, A-GNSS, RTK and/or WLAN positioning.

At action 501, UE 105 sends an NR Radio Resource Control (RRC) idle period request to a gNB 110-1. GNB 110-1 may typically be the serving gNB (or primary serving gNB) for UE 105. The request may include the requested length of the idle period (e.g., 50 ms) and possibly when the idle period should occur, sufficient to measure and obtain LTE timing information later at block 506. Depending on desired functionality, the gNB 110-1 may reply by sending an RRC confirm idle period message at action 502. (Otherwise, in some embodiments, the UE 105 can assume the request sent at action 501 was accepted.) During the requested idle period, at block 503, gNB 110-1 may suspend NR transmission to UE 105 and suspend NR reception from UE 105 in order to allow UE 105 to tune away from NR wireless access during the idle period.

The UE 105 can then tune away from the 5G NR carrier frequency (e.g. for gNB 110-1) during the idle period to an LTE carrier frequency supported by ng-eNBs 180 and/or by eNBs 170. At block 506, the UE 105 can then obtain LTE cell timing and a system frame number (SFN) for an OTDOA reference cell for ng-eNB 180-1 or eNB 170-1 during the idle period. The LTE cell timing and SFN for a reference cell supported by ng-eNB 180-1 or eNB 170-1 may be obtained by UE 105 from an RRC System Information Block (SIB) broadcast by ng-eNB 180-1 or eNB 170-1, respectively, at action 504 or action 505, respectively. For example, UE 105 may acquire and measure a Master Information Block (MIB) and a SIB broadcast by ng-eNB 180-1 or eNB 170-1. The identity and a carrier frequency for the reference cell may have been previously provided to UE 105 by LMF 120 as part of the assistance data sent to UE 105 at actions 414 and 415. The UE 105 may then tune back to NR wireless access to gNB 110-1.

At block 507, the UE 105 can convert the LTE timing of the PRS positioning occasions for reference and neighbor cells for ng-eNBs 180 and/or eNBs 170 provided by the LMF 120 (in the LPP assistance data sent at actions 414 and 415) to corresponding NR timing for the gNB 110-1. This may mean converting LTE PRS subframe timing as described later for FIGS. 6 and 7 to equivalent NR timing (e.g. in terms of NR subframes, NR radio frames or other NR signaling units). In performing this conversion, UE 105 may determine NR measurements gaps (in terms of NR timing) suitable for measuring LTE PRS signals from ng-eNBs 180 and/or eNBs 170.

As indicated in FIG. 5, it can be noted that functions described at actions 501-502 and 504-505 and blocks 503, 506 and 507 are optional, and may be used for OTDOA measurements, if desired. That is, in some embodiments the LMF 120 will provide the UE 105 with information regarding PRS signals transmitted by the ng-eNBs 180 and/or the eNBs 170, including the times at which those PRS signals are transmitted. However, these times may be relative to LTE timing. So, by obtaining timing information from the LTE OTDOA reference cell (or some other LTE cell) at block 506, the UE 105 can discover the LTE timing and corresponding absolute times (e.g. Global Positioning System (GPS) times) or local times (e.g. UE internal times) at which the PRS signals will be transmitted. This can allow the UE 105 to convert the LTE signal timing for PRS occasions to corresponding NR timing.

The actions performed at blocks 506 and 507 may be repeated by UE 105 for each separate PRS carrier frequency used by the reference and neighbor cells which UE 105 was requested to measure by LMF 120 at actions 414 and 415, since typically ng-eNBs 180 and/or eNBs 170 would use a different LTE timing for each different carrier frequency but would be synchronized when using the same LTE carrier frequency as described later for FIGS. 6 and 7. This may enable UE 105 to determine the NR timing corresponding to the LTE timing for each separate LTE carrier frequency. However, if LMF 120 provides UE 105 with the relationship between LTE timing for each separate PRS carrier frequency (e.g. as supported by LPP and as described later in association with FIGS. 6 and 7), UE 105 may only need to obtain the NR timing corresponding to one PRS carrier frequency at blocks 506 and 507, because the UE 105 can use the relationship between the LTE timing for each separate PRS carrier frequency to infer the NR timing corresponding to each PRS carrier frequency.

UE 105 may then send an NR RRC measurement gap request to gNB 110-1 at action 508 to request measurements gaps (e.g. which may comprise a series of periodic short periods of around 5-10 ms, in some embodiments) with respect to NR timing. GNB 110-1 may optionally confirm the request at action 509 (e.g. by sending an RRC confirmation message to UE 105) or UE 105 may assume the request will be supported. During each of the measurement gaps, at block 510, gNB 110-1 may suspend NR transmission to UE 105 and suspend NR reception from UE 105 in order to allow UE 105 to tune away from NR wireless access during each measurement gap.

The UE 105 can then periodically (when each measurement gap occurs) tune away from NR access to gNB 110-1 to acquire and measure a Time of Arrival (TOA) for a PRS broadcast for a reference or neighbor cell for ng-eNB 180-1, at action 511, and acquire and measure a TOA for a PRS broadcast for a reference or neighbor cell for eNB 170-1, at action 512. UE 105 may then obtain an OTDOA RSTD measurement at block 513 from the difference of the two TOA measurements as described later for FIGS. 6 and 7. It is noted that in this example, UE 105 is assumed to measure a PRS broadcast in a cell for each of ng-eNB 180-1 and eNB 170-1 and with one of these cells being a reference cell for OTDOA, However, other scenarios are possible in which UE 105 measures a PRS broadcast in cells for a pair of eNBs 170 or a pair of ng eNBs 180 with one of these cells being a reference cell. Furthermore, in all scenarios, UE 105 may obtain additional TOA measurements during the measurement gaps for PRS broadcast for other neighbor cells by other ng-eNBs 180 and/or other eNBs 170 and may use these additional TOA measurements to determine additional RSTD measurements at block 513. Additionally or instead, UE 105 may obtain other measurements at block 513 during the measurements gaps such as GNSS or RTK measurements for SVs 190. This can be done until sufficient measurements are obtained or until a maximum response interval has expired. At action 514, the UE 105 can then optionally send a RRC measurement gap stop message to the gNB 110-1 to advise gNB 110-1 that measurement gaps are no longer needed.

The UE 105 can then include the measurements in an LPP Provide Location message (e.g., at action 419, continuing the process illustrated in FIG. 4).

In one variant to the procedure shown in FIG. 5, LMF 120 may provide the relationship between NR timing for gNB 110-1 and LTE timing (e.g. for an OTDOA reference cell for ng-eNB 180-1 or eNB 170-1) to UE 105 in the assistance data sent at actions 414 and 415. For example, LMF 120 may request and obtain information from gNB 110-1 using NRPPa by using the same or a similar procedure to that used to obtain OTDOA related information from ng-eNB 180-1 at actions 406-409. If the information obtained from gNB 110-1 and the OTDOA related information obtained from ng-eNB 180-1 at actions 406-409 and/or from eNB 170-1 at actions 410-413 include timing information (e.g. NR timing information relative to an absolute time such as GPS time for gNB 110-1 and LTE timing relative to an absolute time for ng-eNB 180-1 and/or eNB 170-1), then LMF 120 may be able to infer the relationship between NR timing and LTE timing and provide this as assistance data to UE 105 at actions 414 and 415. In this case, UE 105 may not need to perform actions 501-502, actions 504-505 and blocks 506 and 507, and gNB 110-1 may not need to perform block 503.

Figure 6:
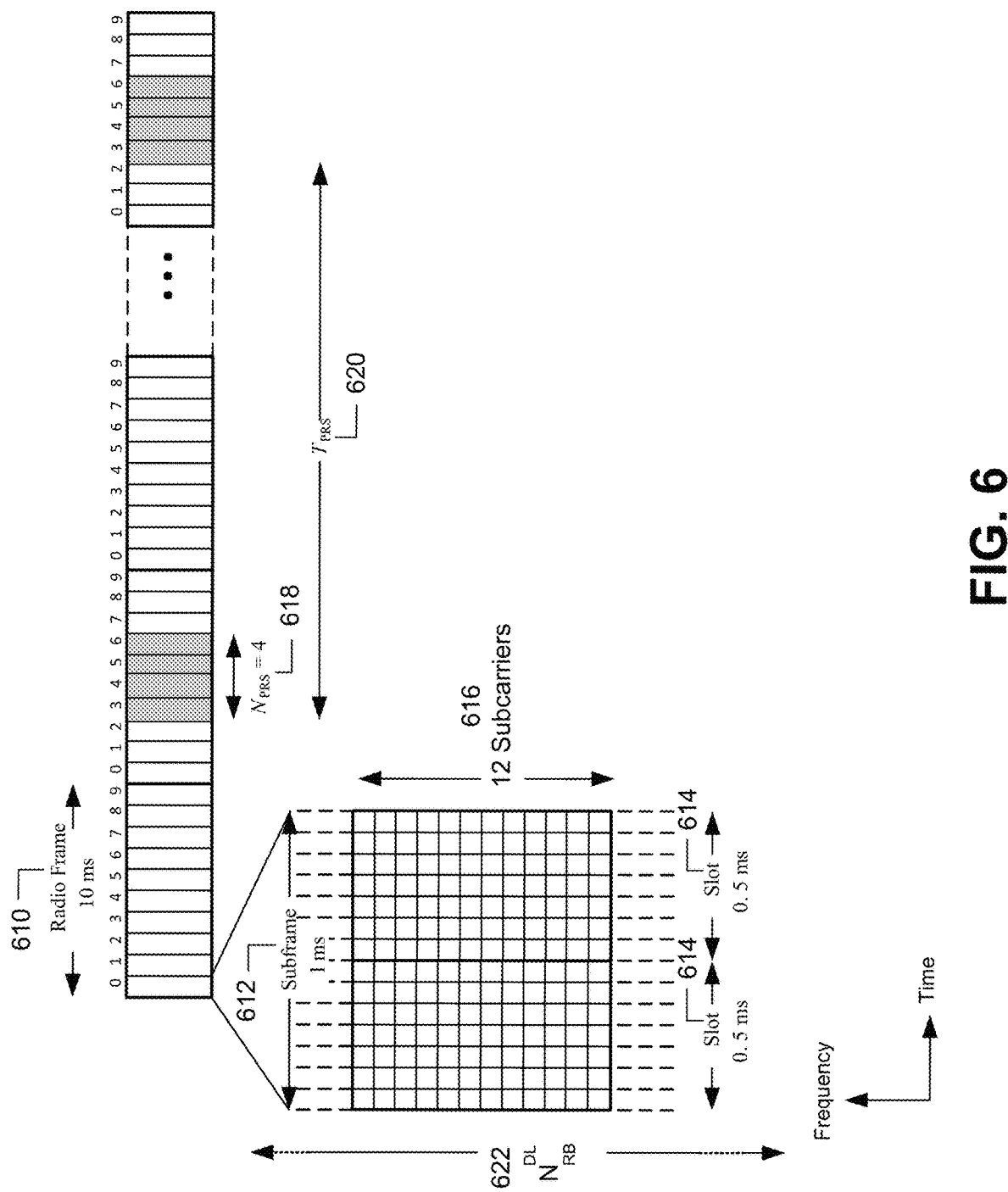
FIG. 6 is a time based diagram illustrating the structure of an exemplary LTE subframe sequence with Positioning Reference Signal (PRS) positioning occasions.

FIG. 6 is an illustration of the structure of an LTE subframe sequence with PRS positioning occasions, according to an embodiment. In FIG. 6, time is represented horizontally (e.g., on an X axis) with time increasing from left to right, while frequency is represented vertically (e.g., on a Y axis) with frequency increasing (or decreasing) from bottom to top, as illustrated. As shown in FIG. 6, downlink and uplink LTE Radio Frames 610 are of 10 ms duration each. For downlink Frequency Division Duplex (FDD) mode, Radio Frames 610 are organized into ten subframes 612 of 1 ms duration each. Each subframe 612 comprises two slots 614, each of 0.5 ms duration.

In the frequency domain, the available bandwidth may be divided into uniformly spaced orthogonal subcarriers 616. For example, for a normal length cyclic prefix using 15 kHz spacing, subcarriers 616 may be grouped into a group of 12 subcarriers. Each grouping, which comprises 12 subcarriers 616, in FIG. 6, is termed a resource block and, in the example above, the number of subcarriers in the resource block may be written as $N_{SC}^{RB}=12$ For a given channel bandwidth, the number of available resource blocks on each channel 622, which is also called the transmission bandwidth configuration 622, is indicated as $N_{RB}^{DL}$ 622. For example, for a 3 MHz channel bandwidth in the above example, the number of available resource blocks on each channel 622 is given by $N_{RB}^{DL}=15$.

In the architecture illustrated in FIG. 1, an ng-eNB 180 and/or an eNB 170 may transmit a PRS (i.e. a downlink (DL) PRS) such as the PRS illustrated in FIG. 6 and (as described later) FIG. 7, which may be measured and used for UE (e.g., UE 105) position determination. Since transmission of a PRS by an ng-eNB 180 and/or eNB 170 is directed to all UEs within radio range, an ng-eNB 180 and/or eNB 170 can also be considered to broadcast a PRS.

A PRS, which has been defined in 3GPP LTE Release-9 and later releases, may be transmitted by ng-eNBs 180 and/or eNBs 170 after appropriate configuration (e.g., by an Operations and Maintenance (O&M) server). A PRS may be transmitted in special positioning subframes that are grouped into positioning occasions (also referred to as PRS positioning occasions or as PRS occasions). For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by an ng-eNB 180 or eNB 170 may occur periodically at intervals, denoted by a number $T_{PRS}$, of millisecond (or subframe) intervals where $T_{PRS}$ may equal 5, 10, 20, 40, 80, 160, 320, 640, or 1280. As an example, FIG. 6 illustrates a periodicity of positioning occasions where $N_{PRS}$ equals 4 and $T_{PRS}$ is greater than or equal to 20. In some embodiments, $T_{PRS}$ may be measured in terms of the number of subframes between the start of consecutive PRS positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and RSTD measurement by a UE 105 for PRS signals that are not muted by avoiding interference from PRS signals that have been muted. Muting may be viewed as the non-transmission of a PRS for a given positioning occasion for a particular cell. Muting patterns may be signaled (e.g. using LPP) to UE 105 using bit strings. For example, in a bit string signaling a muting pattern, if a bit at position j is set to "0", then UE 105 may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID for a cell or Transmission Point (TP) (denoted as $N_{ID}^{PRS}$) or as a function of a Physical Cell Identifier (PCI) (denoted as $N_{ID}^{cell}$) if no PRS ID is assigned, which results in an effective frequency re-use factor of 6.

To improve hearability of a PRS further (e.g. when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by an ng-eNB 180 or an eNB 170 may support more than one PRS configuration, where each PRS configuration comprises a distinct sequence of PRS positioning occasions with a particular number of subframes ($N_{PRS}$) per positioning occasion and a particular periodicity ($T_{PRS}$). Further enhancements of a PRS may also be supported by an ng-eNB 180 or an eNB 170.

OTDOA assistance data is usually provided to a UE 105 by a location server (e.g. E-SMLC 160 or LMF 120) for a "reference cell" and one or more "neighbor cells" or "neighboring cells" relative to the "reference cell." For example, the assistance data may provide the center channel frequency of each cell (also referred to as a carrier frequency), various PRS configuration parameters (e.g., $N_{PRS}$, $T_{PRS}$, muting sequence, frequency hopping sequence, PRS ID, PRS code sequence, PRS bandwidth), a cell global ID and/or other cell related parameters applicable to OTDOA.

PRS positioning by UE 105 may be facilitated by including the serving cell for the UE 105 in the OTDOA assistance data (e.g. with the reference cell indicated as being the serving cell). In the case of a UE 105 with NR wireless access, the reference cell may be chosen by the LMF 120 as some cell for an ng-eNB 180 or eNB 170 with good coverage at the expected approximate location of UE 105 (e.g. as indicated by the known NR serving cell for UE 105).

OTDOA assistance data may also include "expected RSTD" parameters, which provide the UE 105 with information about the RSTD values the UE 105 is expected to measure at its current location between the reference cell and each neighbor cell together with an uncertainty of the expected RSTD parameter. The expected RSTD together with the uncertainty define a search window for the UE 105 within which the UE 105 is expected to measure the RSTD value (or a TOA value corresponding to an RSTD value). OTDOA assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD.

Using the RSTD measurements, the known absolute or relative transmission timing of each cell, and the known position(s) of ng-eNB 180 and/or eNB 170 physical transmitting antennas for the reference and neighboring cells, the UE 105's position may be calculated (e.g., by LMF 120 or by UE 105). The RSTD for a neighbor cell "k" relative to a reference cell "Ref", may be given as (TOA$_k$-TOA$_{Ref}$). TOA measurements for different cells may then be converted to RSTD measurements (e.g. as defined in 3GPP TS 36.214 entitled "Physical layer; Measurements") and sent to the location server (e.g. LMF 120) by the UE 105. Using (i) the RSTD measurements, (ii) the known absolute or relative transmission timing of each cell, and (iii) the known position(s) of ng-eNB 180 and/or eNB 170 physical transmitting antennas for the reference and neighboring cells, the UE 105's position may be determined.

Figure 7:
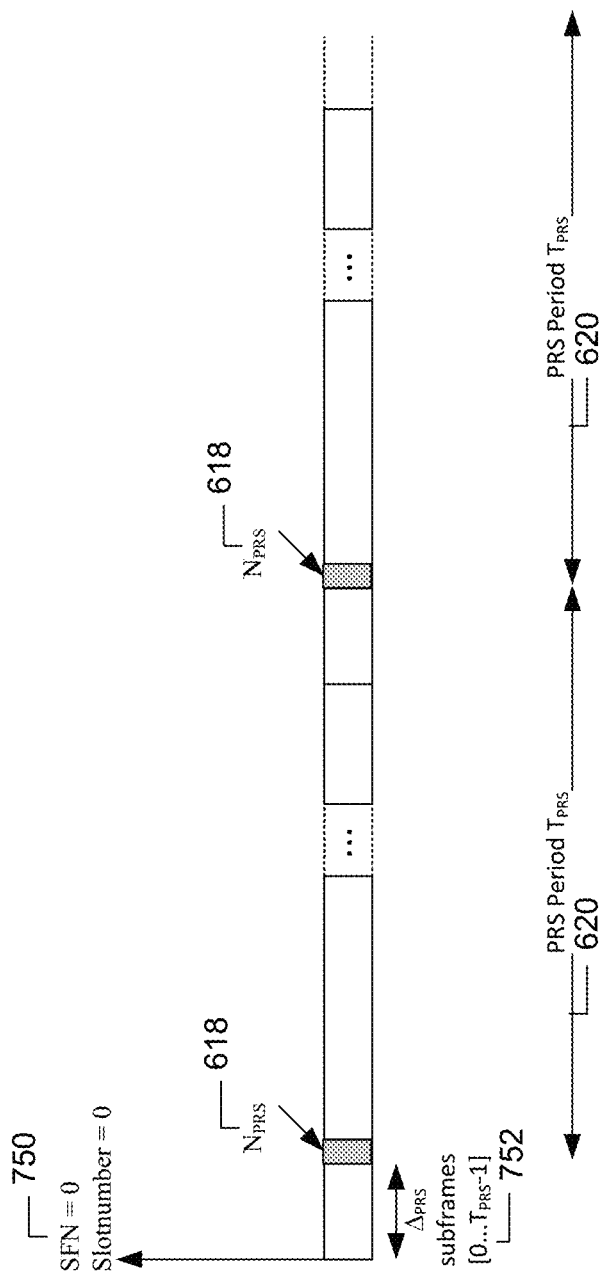
FIG. 7 is a time based diagram illustrating further aspects of PRS transmission for an LTE cell supported by an eNB.

FIG. 7 illustrates further aspects of PRS transmission for a cell supported by an ng-eNB 180 or eNB 170. FIG. 7 shows how PRS positioning occasions are determined by a System Frame Number (SFN), a cell specific subframe offset ($\Delta_{PRS}$) and the PRS Periodicity (T$_{PRS}$) 620. Typically, the cell specific PRS subframe configuration is defined by a "PRS Configuration Index" I$_{PRS}$ included in the OTDOA assistance data. The PRS Periodicity (T$_{PRS}$) 620 and the cell specific subframe offset ($\Delta_{PRS}$) (e.g. as shown in FIG. 7) are defined based on the PRS Configuration Index I$_{PRS}$, in 3GPP TS 36.211 entitled "Physical channels and modulation," as exemplified in Table 1 below.

TABLE 1

| PRS configuration Index $I_{PRS}$ | PRS periodicity $T_{PRS}T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the System Frame Number (SFN) of a cell that transmits PRS. PRS instances, for the first subframe of the N$_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \quad (1)$$

where, n$_f$ is the SFN with 0≤n$_f$≤1023, n$_s$ is the slot number within the radio frame defined by n$_f$ with 0≤n$_s$≤19, T$_{PRS}$ is the PRS periodicity, and $\Delta_{PRS}$ is the cell-specific subframe offset.

As shown in FIG. 7, the cell specific subframe offset $\Delta_{PRS}$ 752 may be defined in terms of the number of subframes transmitted starting from System Frame Number 0, Slot Number 0 750 to the start of the first (subsequent) PRS positioning occasion. In FIG. 7, the number of consecutive positioning subframes 618 (N$_{PRS}$) equals 4.

In some embodiments, when UE 105 receives a PRS configuration index I$_{PRS}$ in the OTDOA assistance data for a particular cell, UE 105 may determine the PRS periodicity T$_{PRS}$ and PRS subframe offset $\Delta_{PRS}$ using Table 1. The UE 105 may then determine the radio frame, subframe and slot when a PRS is scheduled in the cell (e.g. using equation (1)). The OTDOA assistance data may be determined by LMF 120 and includes assistance data for a reference cell, and a number of neighbor cells supported by ng-eNBs 180 and/or eNBs 170.

Typically, PRS occasions from all cells in a network that use the same carrier frequency are aligned in time and may have a fixed known time offset relative to other cells in the network that use a different carrier frequency. In SFN-synchronous networks all ng-eNBs 180 and all eNBs 170 may be aligned on both frame boundary and system frame number. Therefore, in SFN-synchronous networks all cells supported by ng-eNBs 180 and eNBs 170 may use the same PRS configuration index for any particular frequency of PRS transmission. On the other hand, in SFN-asynchronous networks all ng-eNBs 180 and all eNBs 170 may be aligned on a frame boundary, but not system frame number. Thus, in SFN-asynchronous networks the PRS configuration index for each cell may be configured separately by the network so that PRS occasions align in time.

UE 105 may determine the LTE timing (also referred to as PRS timing) of the PRS occasions of the reference and neighbor cells for OTDOA positioning, if UE 105 can obtain the cell timing (e.g., SFN or Frame Number) of at least one of the cells (e.g., the reference cell)—e.g. as at block 506 in FIG. 5. The LTE timing of the other cells may then be derived by UE 105, for example based on the assumption that PRS occasions from different cells overlap.

FIGS. 6 and 7 show how LTE PRS timing may be conveyed, converted, and/or measured at blocks 506, 507 and 513 in FIG. 5.

Figure 8:
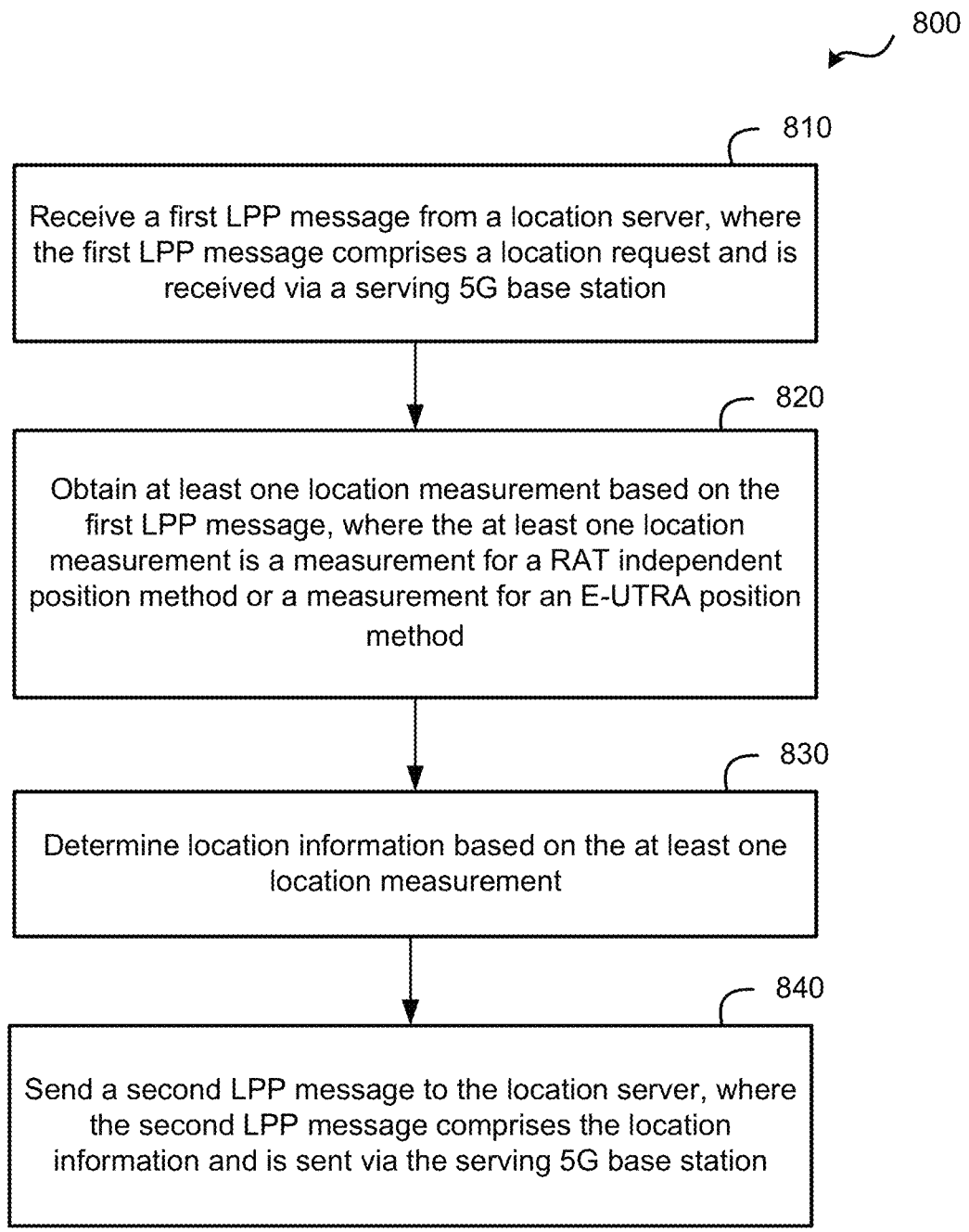
FIGS. 8-10 are flow diagrams illustrating aspects of a method of supporting location of a UE with 5G wireless access, according to different embodiments.

FIG. 8 is a flow diagram illustrating a method 800 of supporting location of a UE with 5G NR wireless access, according to an embodiment. It can be noted that, as with figures appended hereto, FIG. 8 is provided as a non-limiting example. Other embodiments may vary, depending on desired functionality. For example, the functional blocks illustrated in method 800 may be combined, separated, or rearranged to accommodate different embodiments. The method 800 may be performed by a UE such as the UE 105. Means for performing the functionality of method 800 may include hardware and/or software means of a UE, such as the UE 105 for FIGS. 1-5 and shown in FIG. 11 and described above.

The functionality at block 810 comprises receiving a first Long Term Evolution (LTE) Positioning Protocol (LPP) message from a location server such as a Location Management Function (e.g. LMF 120), where the first LPP message comprises a location request and is received via a serving 5G base station such as a gNB (e.g. gNB 110-1). Block 810 may correspond to action 417 in FIG. 4. Means for performing the functionality at block 810 can include, for example, processing unit(s) 1110, bus 1105, memory 1160, wireless communication interface 1130, wireless communication antenna(s) 1132, and/or other hardware and/or software components of the UE 105 as shown in FIG. 11 and described below.

At block 820, at least one location measurement is obtained, based on the first LPP message, where the at least one location measurement is a measurement for a Radio Access Technology (RAT) independent position method or a measurement for an Evolved Universal Terrestrial Radio Access (E-UTRA) position method. In some embodiments, the RAT-independent position method may comprise Assisted Global Navigation Satellite System (A-GNSS), Real Time Kinematics (RTK), Precise Point Positioning (PPP), Differential A-GNSS, Wireless Local Area Network (WLAN) (also referred to as WiFi positioning), Bluetooth, Sensors, or any combination thereof. The E-UTRA position method may comprise Observed Time Difference Of Arrival (OTDOA) for E-UTRA or Enhanced Cell ID (ECID) for E-UTRA. Block 820 may correspond to block 418 in FIG. 4.

Figure 11:
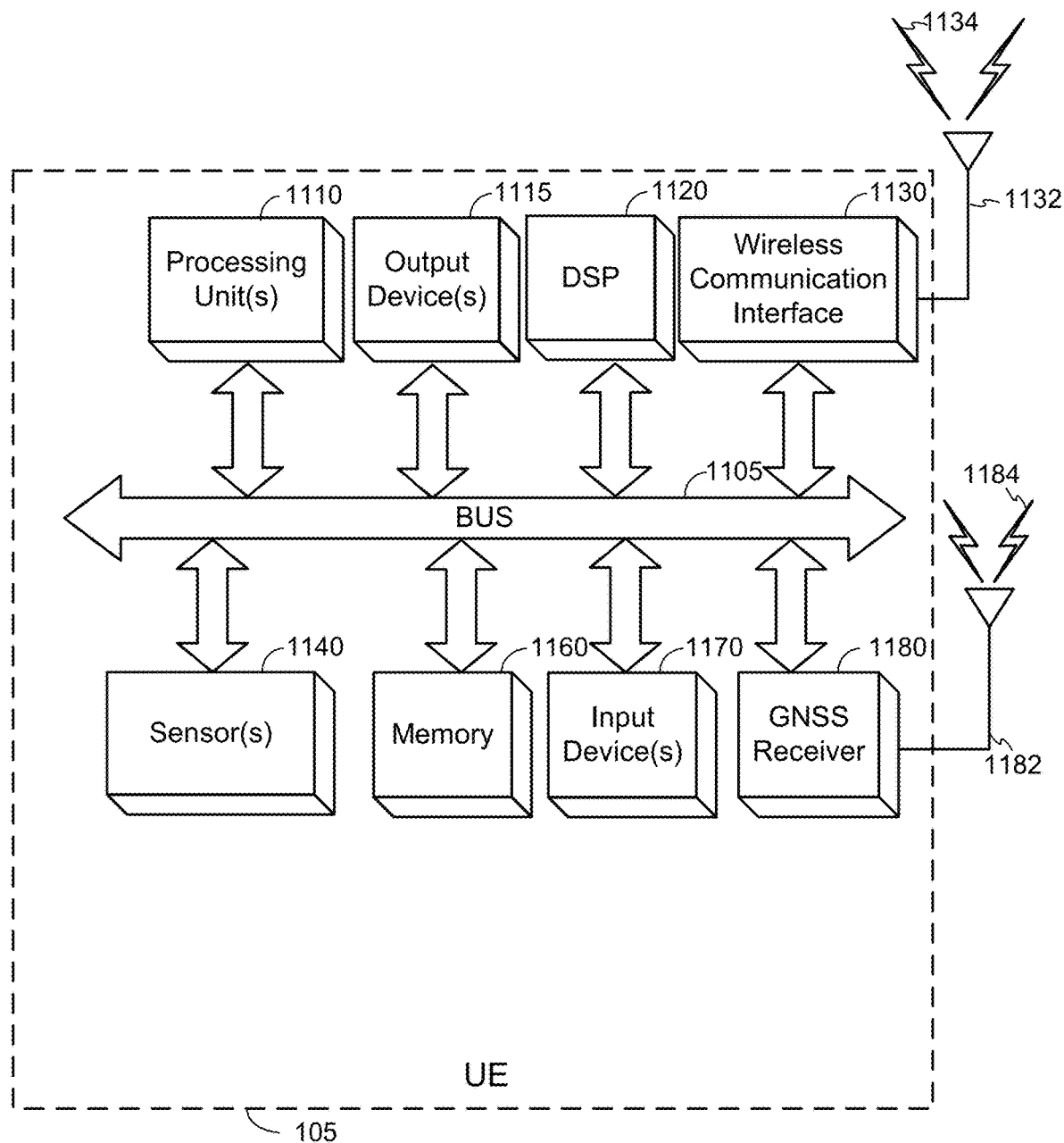
FIG. 11 is a block diagram of an embodiment of a UE.

Means for performing the functionality at block 820 can include, for example, processing unit(s) 1110, bus 1105, memory 1160, wireless communication interface 1130, wireless communication antenna(s) 1132, and/or other hardware and/or software components of the UE 105 as shown in FIG. 11 and described below.

The functionality at block 830 includes determining location information based on the at least one location measurement. For example, the location information may comprise a location estimate for the UE. Alternatively, the location information may comprise the at least one location measurement. Block 830 may correspond to block 418 in FIG. 4. Means for performing the functionality at block 830 can include, for example, processing unit(s) 1110, bus 1105, memory 1160, wireless communication interface 1130, wireless communication antenna(s) 1132, and/or other hardware and/or software components of the UE 105 as shown in FIG. 11 and described below.

The functionality at block 840 includes sending a second LPP message to the location server, where the second LPP message comprises the location information and is sent via the serving 5G base station. Block 840 may correspond to action 419 in FIG. 4. Means for performing the functionality at block 840 can include, for example, processing unit(s) 1110, bus 1105, memory 1160, wireless communication interface 1130, wireless communication antenna(s) 1132, and/or other hardware and/or software components of the UE 105 as shown in FIG. 11 and described below.

Alternative embodiments of the method 800 may include additional features, depending on desired functionality. For instance, in some embodiments, the first LPP message is an LPP Request Location Information message and the second LPP message is an LPP Provide Location Information message. Some embodiments may further include receiving a third LPP message from the location server, where the third LPP message comprises assistance data for the RAT-independent position method or the E-UTRA position method and is received via the serving 5G base station, and where obtaining the at least one location measurement is based on the assistance data. The third LPP message may be an LPP Provide Assistance Data message (e.g. as at action 415 in FIG. 4).

Some embodiments may further include receiving a fourth LPP message from the location server, where the fourth LPP message comprises a request for the LPP positioning capabilities of the UE and is received via the serving 5G base station, and sending a fifth LPP message to the location server. The fifth LPP message may comprise the LPP positioning capabilities of the UE when the UE has NR wireless access and is sent via the serving 5G base station. The fourth LPP message may comprise an LPP Request Capabilities message (e.g. as action 403 in FIG. 4) and the fifth LPP message may comprise an LPP Provide Capabilities message (e.g. as at action 404 in FIG. 4).

In some embodiments, the method 800 may further comprise sending a request for measurement gaps to the serving 5G base station (e.g. as at action 508 in FIG. 5), and obtaining the at least one location measurement during a measurement gap (e.g. as at action 511, action 512 or block 513 of FIG. 5). In such embodiments, the request for measurement gaps may comprise an NR Radio Resource Control (RRC) message. Moreover, in some embodiments, the at least one location measurement may comprise a Reference Signal Time Difference (RSTD) measurement for OTDOA for E-UTRA, and the method may further comprise sending a request for an idle period to the serving 5G base station (e.g. as at action 501 in FIG. 5), and obtaining LTE timing and/or a System Frame Number (SFN) for an OTDOA reference cell (e.g. for LTE) during the idle period (e.g. as at block 506 in FIG. 5), where the request for measurement gaps is based on the LTE timing and/or the SFN (e.g. as described for block 507 for FIG. 5). The request for an idle period may comprise an NR RRC message. The OTDOA reference cell may be a cell for an eNB (e.g. an eNB 170) in an E-UTRAN (e.g. E-UTRAN 150) or may be a cell for an ng-eNB (e.g. an ng-eNB 180) in an NG-RAN (e.g. NG-RAN 135), which may include the serving 5G base station.

Some embodiments may further comprise sending an indication to an Access Management Function (AMF) (e.g. AMF 115), which may occur as part of Registration with the AMF, where the indication is an indication that the UE supports LPP with NR wireless access, and where the AMF transfers the indication to the location server. Additionally or alternatively, the first LPP message may be received in a Non-Access Stratum (NAS) transport message (e.g. a 5G NAS transport message) and the second LPP message may be sent in a NAS transport message (e.g. a 5G NAS transport message), e.g. as described for FIGS. 1-3.

Figure 9:
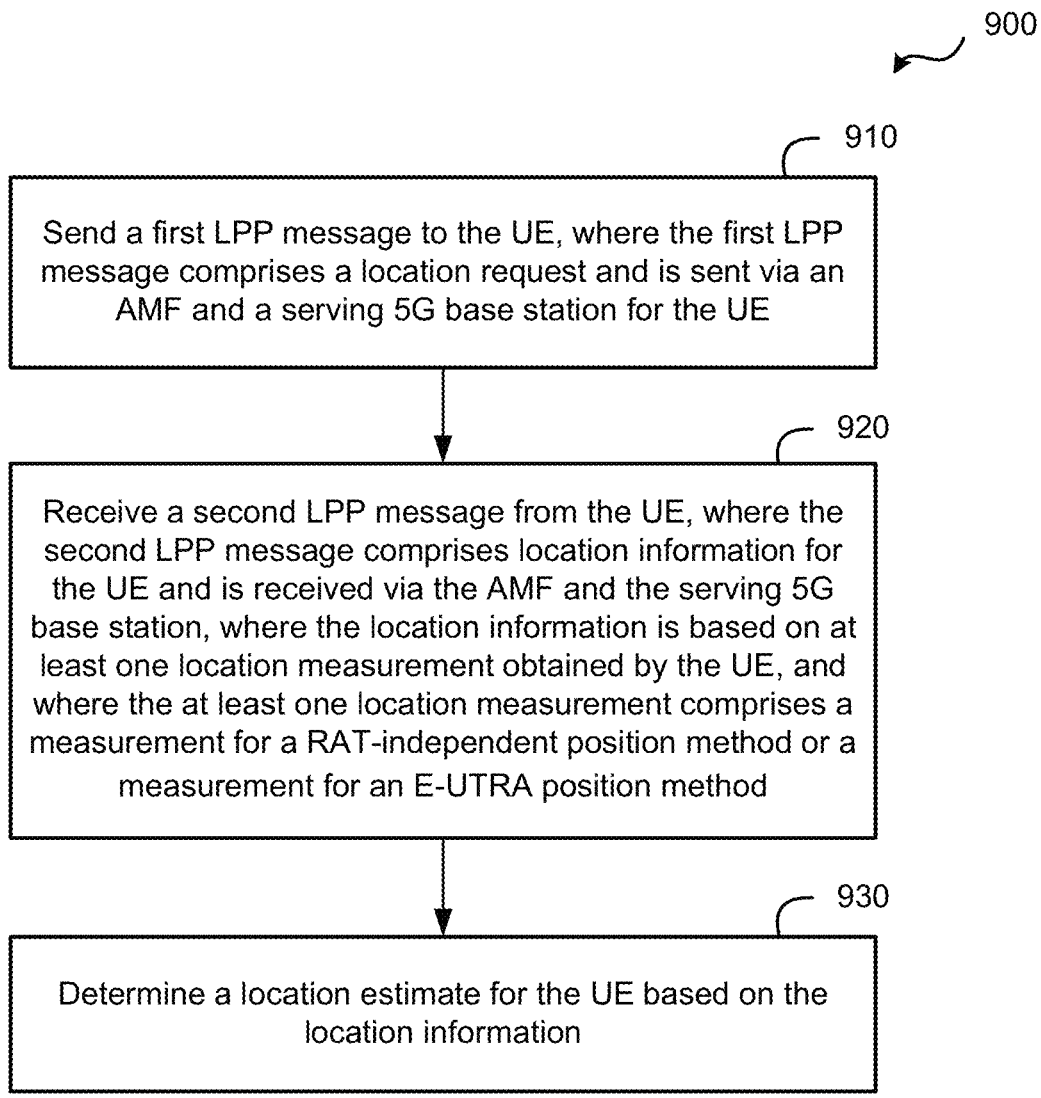

FIG. 9 is a flow diagram illustrating a method 900 at a location server, such as an LMF (e.g. LMF 120), for supporting location of a user equipment (UE) such as UE 105 with Fifth Generation (5G) NR wireless access, according to an embodiment. It can be noted that, as with figures appended hereto, FIG. 9 is provided as a non-limiting example. Other embodiments may vary, depending on desired functionality. For example, the functional blocks illustrated in method 900 may be combined, separated, or rearranged to accommodate different embodiments. The method 900 may be performed by an LMF such as the LMF 120. Means for performing the functionality of method 900 may include hardware and/or software means of a computer system, such as the computer system 1200 shown in FIG. 12 and described in more detail below.

Figure 12:
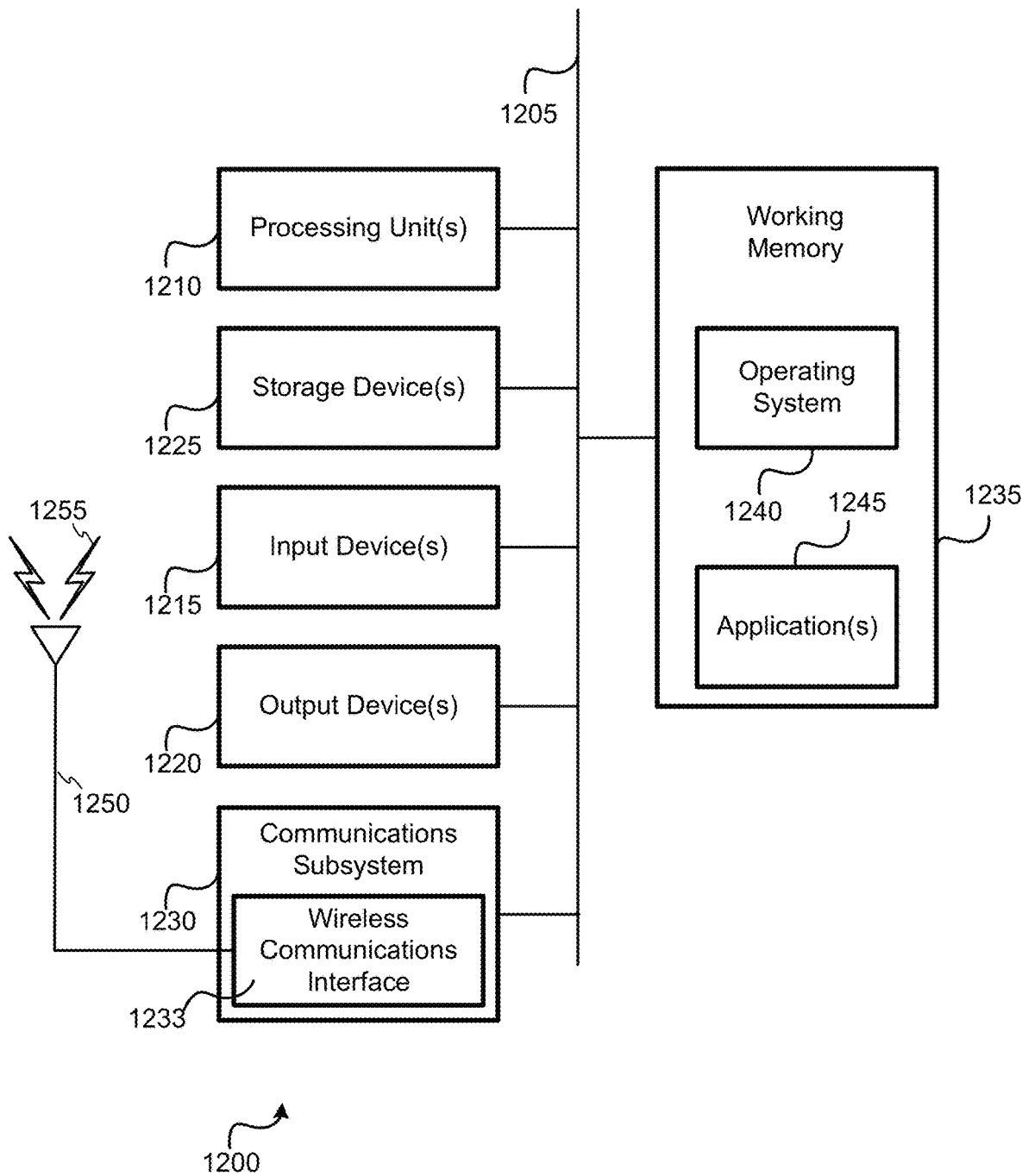
FIG. 12 is a block diagram of an embodiment of a computer system.

The functionality at block 910 includes comprises sending a first Long Term Evolution (LTE) Positioning Protocol (LPP) message to the UE, where the first LPP message comprises a location request and is sent via an Access Management Function (AMF) (e.g., AMF 115) and a serving 5G base station for the UE (e.g. gNB 110-1). Block 910 may correspond to action 416 in FIG. 4. Means for performing the functionality at block 910 can include, for example, processing unit(s) 1210, bus 1205, communications subsystem 1230, wireless communication interface 1233, working memory 1235, operating system 1240, application(s) 1245, and/or other hardware and/or software components of the computer system 1200 as shown in FIG. 12 and described below.

At block 920, a second LPP message is received from the UE, where the second LPP message comprises location information for the UE and is received via the AMF and the serving 5G base station, and where the location information is based on at least one location measurement obtained by the UE. The at least one location measurement may be a measurement for a Radio Access Technology (RAT) independent position method or a measurement for an Evolved Universal Terrestrial Radio Access (E-UTRA) position method. In some embodiments, the RAT-independent position method may comprise Assisted Global Navigation Satellite System (A-GNSS), Real Time Kinematics (RTK), Precise Point Positioning, Differential A-GNSS, Wireless Local Area Network (WLAN), Bluetooth, Sensors, or any combination thereof. The E-UTRA position method may comprise Observed Time Difference Of Arrival (OTDOA) for E-UTRA, and/or Enhanced Cell ID (ECID) for E-UTRA. Block 920 may correspond to action 420 in FIG. 4. Means for performing the functionality at block 920 can include, for example, processing unit(s) 1210, bus 1205, communications subsystem 1230, wireless communication interface 1233, working memory 1235, operating system 1240, application(s) 1245, and/or other hardware and/or software components of the computer system 1200 as shown in FIG. 12 and described below.

At block 930, the functionality includes determining a location estimate for the UE based on the location information. In some embodiments, the location information comprises the location estimate. In some other embodiments, the location information comprises the at least one location measurement. Block 930 may correspond to block 421 in FIG. 4. Means for performing the functionality at block 930 can include, for example, processing unit(s) 1210, bus 1205, working memory 1235, operating system 1240, application(s) 1245, and/or other hardware and/or software components of the computer system 1200 as shown in FIG. 12 and described below.

Alternative embodiments of the method 900 may have one or more additional features. For example, the first LPP message may comprise an LPP Request Location Information message and the second LPP message may comprise an LPP Provide Location Information message.

In some embodiments, the method 900 may further comprise sending a third LPP message to the UE, where the third LPP message comprises assistance data for the RAT-independent position method and/or the E-UTRA position method and is sent via the AMF and the serving 5G base station, and where the at least one location measurement is based at least in part on the assistance data. In these embodiments, the third LPP message may comprise an LTP Provide Assistance Data message (e.g. as at action 414 in FIG. 4). In these embodiments, the at least one location measurement may be a location measurement for OTDOA for E-UTRA, where the assistance data comprises assistance data for at least one eNB (e.g. an eNB 170) in an E-UTRAN (e.g. E-UTRAN 150) or at least one ng-eNB (e.g. an eNB 180) in an NG-RAN (e.g. NG-RAN 135) which may include the serving 5G base station. In these embodiments, the assistance data may comprise configuration information for a PRS transmitted by the at least one eNB or by the at least one ng-eNB (e.g. as described for action 414 for FIG. 4).

The method 900 may optionally comprise sending a fourth LPP message to the UE, where the fourth LPP message comprises a request for the LPP positioning capabilities of the UE and is sent via the AMF and the serving 5G base station, and receiving a fifth LPP message from the UE, where the fifth LPP message comprises the LPP positioning capabilities of the UE, when the UE has NR wireless access, and is received via the AMF and the serving 5G base station. In some embodiments, the fourth LPP message may comprise an LPP Request Capabilities message (e.g. as at action 402 in FIG. 4) and the fifth LPP message may comprise an LPP Provide Capabilities message (e.g. as at action 405 in FIG. 4). Moreover, the method 900 may optionally comprise receiving an indication from the AMF, where the indication is an indication that the UE supports LPP with NR wireless access and where sending the fourth LPP message is based on the indication.

Figure 10:
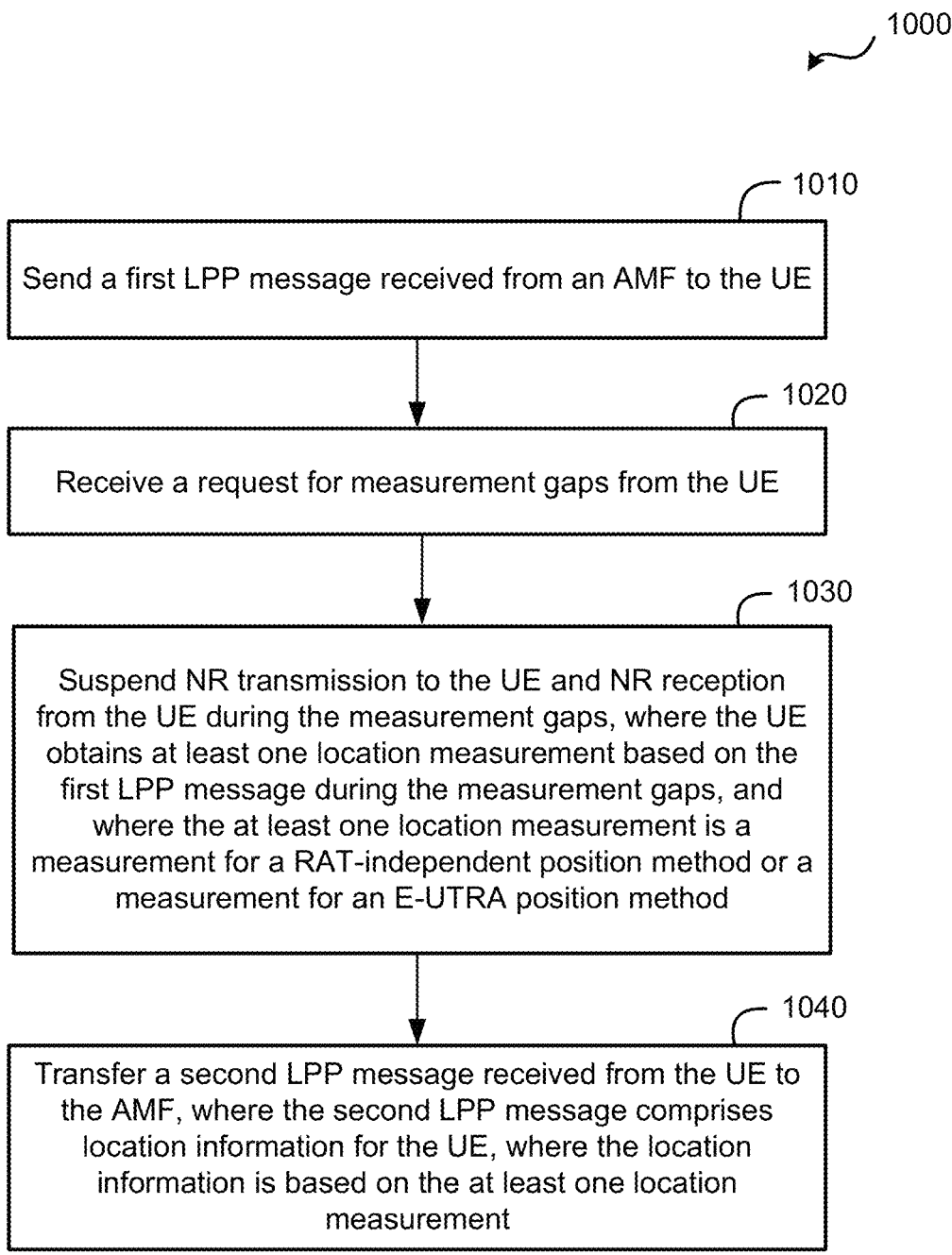

FIG. 10 is a flow diagram illustrating a method 1000 at a 5G base station such as a gNB for supporting location of a user equipment (UE) such as UE 105 with NR wireless access, according to an embodiment. It can be noted that, as with figures appended hereto, FIG. 10 is provided as a non-limiting example. Other embodiments may vary, depending on desired functionality. For example, the functional blocks illustrated in method 1000 may be combined, separated, or rearranged to accommodate different embodiments. The method 1000 may be performed by a gNB such as a gNB 110. Means for performing the functionality of method 1000 may include hardware and/or software means of a computer system, such as the computer system 1200 shown in FIG. 12 and described in more detail below.

The functionality at block 1010 includes sending a first LPP message received from an AMF (e.g. AMF 115) to the UE. For example, block 1010 may include receiving the first LPP message (e.g. an LPP Request Location Information message) inside a NAS transport message from the AMF (or from the AMF via an ng-eNB such as an ng-eNB 180) and sending the first LPP message inside the NAS transport message to the UE as described previously in association with FIGS. 1-3. In an embodiment, the 5G base station may be a serving base station for the UE. Block 1010 may correspond to support of action 417 by gNB 110-1 in FIG. 4. Means for performing the functionality at block 1010 can include, for example, processing unit(s) 1210, bus 1205, communications subsystem 1230, wireless communication interface 1233, antenna 1250, working memory 1235, operating system 1240, application(s) 1245, and/or other hardware and/or software components of the computer system 1200 as shown in FIG. 12 and described below.

At block 1020, the functionality includes receiving a request for measurement gaps from the UE (e.g. as at action 508 in FIG. 5). For example, the request for measurement gaps may comprise an NR Radio Resource Control (RRC) message. Means for performing the functionality at block 1020 can include, for example, processing unit(s) 1210, bus 1205, communications subsystem 1230, wireless communication interface 1233, antenna 1250, working memory 1235, operating system 1240, application(s) 1245, and/or other hardware and/or software components of the computer system 1200 as shown in FIG. 12 and described below.

At block 1030, the functionality includes suspending NR transmission to the UE and suspending NR reception from the UE during the measurement gaps, where the UE obtains at least one location measurement based on the first LPP message during the measurement gaps, and where the at least one location measurement is a measurement for a Radio Access Technology (RAT)-independent position method or a measurement for an Evolved Universal Terrestrial Radio Access (E-UTRA) position method. In some embodiments, the RAT-independent position method may comprise Assisted Global Navigation Satellite System (A-GNSS), Real Time Kinematics (RTK), Precise Point Positioning (PPP), Differential A-GNSS, Wireless Local Area Network (WLAN), Bluetooth, Sensors, or any combination thereof. Moreover, the E-UTRA position method may comprise Observed Time Difference Of Arrival (OTDOA) for E-UTRA and/or Enhanced Cell ID (ECID) for E-UTRA. Block 1030 may correspond to block 510 in FIG. 5. Means for performing the functionality at block 1030 can include, for example, processing unit(s) 1210, bus 1205, communications subsystem 1230, wireless communication interface 1233, antenna 1250, working memory 1235, operating system 1240, application(s) 1245, and/or other hardware and/or software components of the computer system 1200 as shown in FIG. 12 and described below.

At block 1040, the functionality includes transferring a second LPP message received from the UE to the AMF, where the second LPP message comprises location information for the UE, and where the location information is based on the at least one location measurement. For example, block 1040 may include receiving the second LPP message (e.g. an LPP Provide Location Information message) inside a NAS transport message from the UE and sending the second LPP message inside the NAS transport message to the AMF (or sending the second LPP message to the AMF via an ng-eNB such as an ng-eNB 180) as described previously in association with FIGS. 1-3. In one embodiment, the location information comprises a location estimate for the UE. In another embodiment, the location information comprises the at least one location measurement. Block 1040 may correspond to support of action 419 by gNB 110-1 in FIG. 4. Means for performing the functionality at block 1040 can include, for example, processing unit(s) 1210, bus 1205, communications subsystem 1230, wireless communication interface 1233, antenna 1250, working memory 1235, operating system 1240, application(s) 1245, and/or other hardware and/or software components of the computer system 1200 as shown in FIG. 12 and described below.

Alternative embodiments of the method 1000 may have one or more additional features. For example, and as at action 509 in FIG. 5, the method 1000 may optionally comprise sending an RRC message to the UE, where the RRC message confirms the measurement gaps requested by the UE at block 1010. Moreover, in some embodiments, the at least one location measurement comprises a Reference Signal Time Difference (RSTD) measurement for OTDOA for E-UTRA. In these embodiments, the method 1000 may optionally further comprise receiving a request from the UE for an idle period (e.g. as at action 501 in FIG. 5), and suspending NR transmission to the UE and suspending NR reception from the UE during the idle period (e.g. as at action 503 in FIG. 5), where the UE obtains LTE timing and/or a System Frame Number (SFN) for an OTDOA reference cell during the idle period (e.g. as at block 506 in FIG. 5), and where the request for measurement gaps is based on the LTE timing and/or on the SFN (e.g. as described for block 507 for FIG. 5). In these embodiments, the request for an idle period may comprise an NR Radio Resource Control (RRC) message. In these embodiments, the method 1000 may further comprise sending an RRC message to the UE, where the RRC message confirms the idle period (e.g. as at action 502 in FIG. 5).

FIG. 11 is a block diagram of an embodiment of a UE 105, which can be utilized as described in the embodiments described above and in association with FIGS. 1-10. It should be noted that FIG. 11 is meant only to provide a generalized illustration of various components of UE 105, any or all of which may be utilized as appropriate. In other words, because UEs can vary widely in functionality, they may include only a portion of the components shown in FIG. 11. It can be noted that, in some instances, components illustrated by FIG. 11 can be localized to a single physical device and/or distributed among various networked devices, which may be disposed at different physical locations.

The UE 105 is shown comprising hardware elements that can be electrically coupled via a bus 1105 (or may otherwise be in communication, as appropriate). The hardware elements may include a processing unit(s) 1110 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 11, some embodiments may have a separate DSP 1120, depending on desired functionality. The UE 105 also may comprise one or more input devices 1170, which may comprise without limitation one or more touch screens, touch pads, microphones, buttons, dials, switches, and/or the like; and one or more output devices 1115, which may comprise without limitation, one or more displays, light emitting diode (LED)s, speakers, and/or the like.

The UE 105 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX™ device, cellular communication facilities, etc.), and/or the like, which may enable the UE 105 to communicate via the networks described above with regard to FIGS. 1-3. The wireless communication interface 1130 may permit data to be communicated with a network, eNBs, ng-eNBs, gNBs, and/or other network components, computer systems, and/or any other electronic devices described herein. The communication can be carried out via one or more wireless communication antenna(s) 1132 that send and/or receive wireless signals 1134.

Depending on desired functionality, the wireless communication interface 1130 may comprise separate transceivers to communicate with base stations (e.g., eNBs, ng-eNBs and/or gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1140. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the position determination described herein.

Embodiments of the UE 105 may also include a GNSS receiver 1180 capable of receiving signals 1184 from one or more GNSS satellites (e.g., SVs 190) using an GNSS antenna 1182 (which may be combined in some implementations with antenna(s) 1132). Such positioning can be utilized to complement and/or incorporate the techniques described herein. The GNSS receiver 1180 can extract a position of the UE 105, using conventional techniques, from GNSS SVs (e.g. SVs 190) of an GNSS system, such as Global Positioning System (GPS), Galileo, Glonass, Compass, Quasi-Zenith Satellite System (QZSS) over Japan, Indian Regional Navigational Satellite System (IRNSS) over India, Beidou over China, and/or the like. Moreover, the GNSS receiver 1180 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 105 may further include and/or be in communication with a memory 1160. The memory 1160 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1160 of the UE 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 105 (and/or a processing unit within the UE 105). In an aspect, then, such code and/or instructions can be used to configure and/or adapt a general purpose computer (or other device) to perform one or more operations in accordance with the described methods.

FIG. 12 is a block diagram of an embodiment of a computer system 1200, which may be used, in whole or in part, to provide the functions of one or more network components as described in the embodiments above (e.g., the LMF 120, AMF 115, gNBs 110, ng-eNBs 180, eNBs 170 etc.). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g. signals according to NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a UE (e.g. UE 105), other computer systems (e.g. an AMF 115, a gNB 110, an ng-eNB 180 and/or an eNB 170), and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

It will be additionally apparent to those skilled in the art that embodiments described herein may result in novel functionality at the UE, location server, and/or base station.

For example, embodiments may include a method of, means for, or device configured to perform functions at a location server to support location of a UE with 5G NR wireless access, where the functions include sending a first LPP message to the UE, wherein the first LPP message comprises a location request and is sent via an AMF and a serving 5G base station for the UE. Functions further include receiving a second LPP message from the UE, wherein the second LPP message comprises location information for the UE and is received via the AMF and the serving 5G base station, where the location information is based on at least one location measurement obtained by the UE, and where the at least one location measurement comprises a measurement for a RAT-independent position method or a measurement for an E-UTRA position method. The functions also include determining a location estimate for the UE based on the location information.

Alternative embodiments may additionally include one or more of the following features. The location information may comprise the location estimate or the at least one location measurement. The first LPP message may comprise an LPP Request Location Information message and the second LPP message may comprise an LPP Provide Location Information message. The RAT-independent position method may comprise Assisted Global Navigation Satellite System (A-GNSS), Real Time Kinematics (RTK), Precise Point Positioning, Differential A-GNSS, Wireless Local Area Network (WLAN), Bluetooth, Sensors, or any combination thereof. The E-UTRA position method may comprise Observed Time Difference Of Arrival (OTDOA) for E-UTRA, or Enhanced Cell ID (ECID) for E-UTRA, or any combination thereof. Functions may further include sending a third LPP message to the UE, where the third LPP message comprises assistance data for the RAT-independent position method or the E-UTRA position method and is sent via the AMF and the serving 5G base station, and where the at least one location measurement is based at least in part on the assistance data. The third LPP message may comprise an LPP Provide Assistance Data message. The least one location measurement may comprise a location measurement for OTDOA for E-UTRA, wherein the assistance data comprises assistance data for at least one evolved Node B (eNB) in an E-UTRA network (E-UTRAN) or at least one next generation eNB (ng-eNB) in a Next Generation Radio Access Network (NG-RAN), wherein the serving 5G base station is in the NG-RAN. The assistance data may comprise configuration information for a Positioning Reference Signal (PRS) transmitted by the at least one eNB or by the at least one ng-eNB. Functions may further comprise sending a fourth LPP message to the UE, where the fourth LPP message comprises a request for LPP positioning capabilities of the UE and is sent via the AMF and the serving 5G base station, and receiving a fifth LPP message from the UE, where the fifth LPP message comprises the LPP positioning capabilities of the UE when the UE has NR wireless access and is received via the AMF and the serving 5G base station. The fourth LPP message may comprise an LPP Request Capabilities message and the fifth LPP message comprises an LPP Provide Capabilities message. Functions may further comprise receiving an indication from the AMF, where the indication comprises an indication that the UE supports LPP with NR wireless access, and where sending the fourth LPP message is based on the indication.

In another example, embodiments may include a method of, means for, or device configured to perform functions at a 5G New Radio (NR) base station to support location of a UE with 5G NR wireless access. Here, the functions comprise sending a first Long Term Evolution (LTE) Positioning Protocol (LPP) message received from an access management function (AMF) to the UE, receiving a request for measurement gaps from the UE, suspending NR transmission to the UE and NR reception from the UE during the measurement gaps, where the UE obtains at least one location measurement based on the first LPP message during the measurement gaps, and where the at least one location measurement is a measurement for a Radio Access Technology (RAT)-independent position method or a measurement for an Evolved Universal Terrestrial Radio Access (E-UTRA) position method. Functions further comprise sending a second LPP message received from the UE to the AMF, where the second LPP message comprises location information for the UE, and where the location information is based on the at least one location measurement.

Alternative embodiments may additionally include one or more of the following features. The 5G NR base station may comprise a serving base station for the UE. The 5G NR base station may transfer the first LPP message and the second LPP message inside a Non-Access Stratum (NAS) transport message. The RAT-independent position method may comprise Assisted Global Navigation Satellite System (A-GNSS), Real Time Kinematics (RTK), Precise Point Positioning (PPP), Differential A-GNSS, Wireless Local Area Network (WLAN), Bluetooth, Sensors, or any combination thereof. The E-UTRA position method may comprise Observed Time Difference Of Arrival (OTDOA) for E-UTRA or Enhanced Cell ID (ECID) for E-UTRA, or any combination thereof. The location information may comprise a location estimate for the UE. The location information may comprise the at least one location measurement.

The request for measurement gaps may comprise an NR Radio Resource Control (RRC) message. Functions may also comprise sending an RRC message to the UE, wherein the RRC message confirms the measurement gaps. The at least one location measurement may comprise a Reference Signal Time Difference (RSTD) measurement for OTDOA for E-UTRA, and functions may further comprise receiving a request from the UE for an idle period, and suspending NR transmission to the UE and NR reception from the UE during the idle period, where the UE obtains LTE timing and a System Frame Number (SFN) for an OTDOA reference cell during the idle period, and where the request for measurement gaps is based on the LTE timing and the SFN. The request for an idle period may comprise an NR Radio Resource Control (RRC) message. Functions may further comprise sending an RRC message to the UE, wherein the RRC message confirms the idle period.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a Random Access Memory (RAM), a Programmable Read-Only Memory (PROM), Erasable PROM (EPROM), a Flash-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method at a location server of supporting location of a user equipment (UE) with 3rd Generation Partnership Project (3GPP) Fifth Generation (5G) New Radio (NR) wireless access, the method comprising:
   sending a first Long Term Evolution (LTE) Positioning Protocol (LPP) message to the UE, wherein the first LPP message comprises a location request and is sent via an Access Management Function (AMF) and a serving 5G base station for the UE;
   receiving a second LPP message from the UE, wherein the second LPP message comprises location information for the UE and is received via the AMF and the serving 5G base station, wherein the location information is based on at least one location measurement obtained by the UE, wherein the at least one location measurement comprises a measurement for a Radio Access Technology (RAT)-independent position method or a measurement for an Evolved Universal Terrestrial Radio Access (E-UTRA) position method; and
   determining a location estimate for the UE based on the location information.

2. The method of claim 1, wherein the location information comprises the location estimate.

3. The method of claim 1, wherein the location information comprises the at least one location measurement.

4. The method of claim 1, wherein the first LPP message comprises an LPP Request Location Information message and the second LPP message comprises an LPP Provide Location Information message.

5. The method of claim 1, wherein the RAT-independent position method comprises Assisted Global Navigation Satellite System (A-GNSS), Real Time Kinematics (RTK), Precise Point Positioning, Differential A-GNSS, Wireless Local Area Network (WLAN), Bluetooth, Sensors, or any combination thereof, or the E-UTRA position method comprises Observed Time Difference Of Arrival (OTDOA) for E-UTRA, or Enhanced Cell ID (ECID) for E-UTRA, or any combination thereof.

6. The method of claim 1, further comprising:
   sending a third LPP message to the UE, wherein the third LPP message comprises assistance data for the RAT-independent position method or the E-UTRA position method and is sent via the AMF and the serving 5G base station, and wherein the at least one location measurement is based at least in part on the assistance data.

7. The method of claim 6, wherein the third LPP message comprises an LPP Provide Assistance Data message.

8. The method of claim 6, wherein the at least one location measurement is a location measurement for OTDOA for E-UTRA, wherein the assistance data comprises assistance data for at least one evolved Node B (eNB) in an E-UTRA network (E-UTRAN) or at least one next generation eNB (ng-eNB) in a Next Generation Radio Access Network (NG-RAN), wherein the serving 5G base station is in the NG-RAN.

9. The method of claim 8, wherein the assistance data comprises configuration information for a Positioning Reference Signal (PRS) transmitted by the at least one eNB or by the at least one ng-eNB.

10. The method of claim 1, further comprising:
    sending a fourth LPP message to the UE, wherein the fourth LPP message comprises a request for LPP positioning capabilities of the UE and is sent via the AMF and the serving 5G base station; and
    receiving a fifth LPP message from the UE, wherein the fifth LPP message comprises the LPP positioning capabilities of the UE when the UE has NR wireless access and is received via the AMF and the serving 5G base station.

11. The method of claim 10, wherein the fourth LPP message comprises an LPP Request Capabilities message and the fifth LPP message comprises an LPP Provide Capabilities message.

12. The method of claim 11, further comprising:
    receiving an indication from the AMF, wherein the indication comprises an indication that the UE supports LPP with NR wireless access, and wherein sending the fourth LPP message is based on the indication.

13. A location server for supporting location of a user equipment (UE) with 3rd Generation Partnership Project (3GPP) Fifth Generation (5G) New Radio (NR) wireless access, the location server comprising:
    a communication interface;
    a memory; and
    a processing unit communicatively coupled with the communication interface and the memory, and configured to cause the location server to:
      send a first Long Term Evolution (LTE) Positioning Protocol (LPP) message to the UE, wherein the first LPP message comprises a location request and is sent via an Access Management Function (AMF) and a serving 5G base station for the UE;
      receive a second LPP message from the UE, wherein the second LPP message comprises location information for the UE and is received via the AMF and the serving 5G base station, wherein the location information is based on at least one location measurement obtained by the UE, wherein the at least one location measurement comprises a measurement for a Radio Access Technology (RAT)-independent position method or a measurement for an Evolved Universal Terrestrial Radio Access (E-UTRA) position method; and
      determine a location estimate for the UE based on the location information.

14. The location server of claim 13, wherein the processing unit is configured to cause the location server to:
    send a third LPP message to the UE, wherein the third LPP message comprises assistance data for the RAT-independent position method or the E-UTRA position method and is sent via the AMF and the serving 5G base station, and wherein the at least one location measurement is based at least in part on the assistance data.

15. The location server of claim 13, wherein the processing unit is configured to cause the location server to:
    send a fourth LPP message to the UE, wherein the fourth LPP message comprises a request for LPP positioning capabilities of the UE and is sent via the AMF and the serving 5G base station; and
    receive a fifth LPP message from the UE, wherein the fifth LPP message comprises the LPP positioning capabilities of the UE when the UE has NR wireless access and is received via the AMF and the serving 5G base station.

16. A method at a Fifth Generation (5G) New Radio (NR) base station of supporting location of a user equipment UE with NR wireless access, the method comprising:
  transferring a first Long Term Evolution (LTE) Positioning Protocol (LPP) message received from an access management function (AMF) to the UE;
  receiving a request for measurement gaps from the UE;
  suspending NR transmission to the UE and NR reception from the UE during the measurement gaps, wherein the UE obtains at least one location measurement based on the first LPP message during the measurement gaps, wherein the at least one location measurement is a measurement for a Radio Access Technology (RAT)-independent position method or a measurement for an Evolved Universal Terrestrial Radio Access (E-UTRA) position method; and
  transferring a second LPP message received from the UE to the AMF, wherein the second LPP message comprises location information for the UE, the location information based on the at least one location measurement.

17. The method of claim 16, wherein the 5G NR base station is a serving base station for the UE.

18. The method of claim 16, wherein the 5G NR base station transfers the first LPP message and the second LPP message inside a Non-Access Stratum (NAS) transport message.

19. The method of claim 16, wherein the RAT-independent position method comprises Assisted Global Navigation Satellite System (A-GNSS), Real Time Kinematics (RTK), Precise Point Positioning (PPP), Differential A-GNSS, Wireless Local Area Network (WLAN), Bluetooth, Sensors, or any combination thereof, or the E-UTRA position method comprises Observed Time Difference Of Arrival (OTDOA) for E-UTRA or Enhanced Cell ID (ECID) for E-UTRA, or any combination thereof.

20. The method of claim 16, wherein the location information comprises a location estimate for the UE.

21. The method of claim 16, wherein the location information comprises the at least one location measurement.

22. The method of claim 16, wherein the request for measurement gaps comprises an NR Radio Resource Control (RRC) message.

23. The method of claim 22, further comprising:
  sending an RRC message to the UE, wherein the RRC message confirms the measurement gaps.

24. The method of claim 16, wherein the at least one location measurement comprises a Reference Signal Time Difference (RSTD) measurement for OTDOA for E-UTRA, and wherein the method further comprises:
  receiving a request from the UE for an idle period; and
  suspending NR transmission to the UE and NR reception from the UE during the idle period, wherein the UE obtains LTE timing and a System Frame Number (SFN) for an OTDOA reference cell during the idle period, wherein the request for measurement gaps is based on the LTE timing and the SFN.

25. The method of claim 24, wherein the request for the idle period comprises an NR Radio Resource Control (RRC) message.

26. The method of claim 25, further comprising:
  sending the RRC message to the UE, wherein the RRC message confirms the idle period.

27. A Fifth Generation (5G) New Radio (NR) base station for supporting location of a user equipment (UE) with 3rd Generation Partnership Project (3GPP) 5G NR wireless access, the 5G NR base station comprising:
  a communications subsystem comprising a wireless communication interface;
  a memory; and
  a processing unit communicatively coupled with the communications subsystem, the network interface, and the memory, and configured to cause the 5G NR base station to:
    transfer a first Long Term Evolution (LTE) Positioning Protocol (LPP) message received from an access management function (AMF) to the UE;
    receive a request for measurement gaps from the UE;
    suspend NR transmission to the UE and NR reception from the UE during the measurement gaps, wherein the UE obtains at least one location measurement based on the first LPP message during the measurement gaps, wherein the at least one location measurement is a measurement for a Radio Access Technology (RAT)-independent position method or a measurement for an Evolved Universal Terrestrial Radio Access (E-UTRA) position method; and
    transfer a second LPP message received from the UE to the AMF, wherein the second LPP message comprises location information for the UE, the location information based on the at least one location measurement.

28. The 5G NR base station of claim 27, wherein the processing unit is further configured to cause the 5G NR base station to transfer the first LPP message and the second LPP message inside a Non-Access Stratum (NAS) transport message.

29. The 5G NR base station of claim 27, wherein the request for measurement gaps comprises an NR Radio Resource Control (RRC) message, and wherein the processing unit is further configured to cause the 5G NR base station to send the RRC message, confirming the measurement gaps, to the UE.

30. The 5G NR base station of claim 27, wherein the at least one location measurement comprises a Reference Signal Time Difference (RSTD) measurement for OTDOA for E-UTRA, and wherein the processing unit is further configured to cause the 5G NR base station to:
  receive a request from the UE for an idle period; and
  suspend NR transmission to the UE and NR reception from the UE during the idle period, wherein the UE obtains LTE timing and a System Frame Number (SFN) for an OTDOA reference cell during the idle period, wherein the request for measurement gaps is based on the LTE timing and the SFN.

* * * * *